United States Patent [19]

Thomson

[11] Patent Number: 4,596,024
[45] Date of Patent: Jun. 17, 1986

[54] DATA DETECTOR USING PROBABALISTIC INFORMATION IN RECEIVED SIGNALS

[75] Inventor: David J. Thomson, New Providence, N.J.

[73] Assignee: AT&T Bell Laboratories, Murray Hill, N.J.

[21] Appl. No.: 497,228

[22] Filed: May 23, 1983

[51] Int. Cl.[4] ............................................. H04B 7/10
[52] U.S. Cl. .................................. 375/100; 370/106; 364/575
[58] Field of Search ................... 375/75, 99, 100, 101, 375/104; 371/6, 69; 364/574, 575, 581, 734; 324/77 R, 77 A; 455/226; 370/106

[56] References Cited

U.S. PATENT DOCUMENTS

| | | | |
|---|---|---|---|
| 2,982,852 | 5/1961 | Fano | 375/38 |
| 3,341,658 | 9/1967 | Kaneko | 375/11 |
| 3,626,168 | 7/1969 | Norsworthy | 324/77 R |
| 3,633,107 | 1/1972 | Brady | 375/40 |
| 3,720,871 | 3/1973 | Brown | 324/77 R |
| 3,732,405 | 5/1973 | Stewart | 364/484 |
| 3,833,797 | 9/1974 | Grobman et al. | 364/574 |
| 4,015,238 | 3/1977 | Davis | 371/43 |
| 4,029,900 | 6/1977 | Addeo | 375/114 |
| 4,047,153 | 9/1977 | Thirion | 375/101 |
| 4,063,174 | 12/1977 | Gupta et al. | 455/135 |
| 4,128,809 | 12/1978 | Kage | 375/100 |
| 4,163,209 | 7/1979 | McRae | 371/6 |
| 4,166,980 | 9/1979 | Apostolos et al. | 455/226 |
| 4,242,755 | 12/1980 | Gauzan | 375/114 |
| 4,312,074 | 1/1982 | Pautler et al. | 375/96 |
| 4,317,111 | 2/1982 | Masoero | 375/110 |
| 4,352,094 | 9/1982 | Reneric | 364/734 |
| 4,375,102 | 2/1983 | Van Daal | 375/94 |
| 4,400,811 | 8/1983 | Brown et al. | 371/69 |
| 4,432,094 | 2/1984 | Das Gupta | 375/102 |

OTHER PUBLICATIONS

William C. Jakes, Jr., "Microwave Mobile Communications", John Wiley Son, N.Y., London, 1974, pp. 390-395.

Primary Examiner—Benedict V. Safourek
Assistant Examiner—Stephen Chin
Attorney, Agent, or Firm—Charles Scott Phelan

[57] ABSTRACT

Received data signals in digital form are sampled a plurality of times during each bit interval and weighted to enhance the statistical effect of a predetermined intermediate amplitude range prior to accumulation over a bit time to obtain an initial average indication of bit value. Plural repetitions of the same bit received at different times are similarly processed and the averages weighted according to received signal strength at the time of reception. Then the weighted averages are accumulated in a two's complement arithmetic fashion so that the accumulation sign bit binary signal state indicates the binary value of the bit. In one embodiment, the initially derived multiple samples of each bit are converted to in-phase and quadrature-phase versions prior to the sample accumulation step; and the separate accumulations of each version are utilized to obtain an arctangent value for adjusting the phase of a local clock to that of the received data.

14 Claims, 18 Drawing Figures

FIG. 9

| NON-DECODER FUNCTIONS | |
|---|---|
| PACKED BIT BUFFER | |
| DATA SIGNAL BIT VALUES BUFFER | |
| RECIRCULATING DATA BUFFER | RAM |
| RAM, MISC. DECODING USES | |
| PROCESSOR MISC. CONTROL AND SUPERVISORY REGISTERS | |
| b9 RECIRCULATING BUFFER POINTER | |
| b8 SCRATCH PAD REGISTER | |
| b7 MAIN QUADRATURE ACCUM. | |
| b6 MAIN DATA ACCUM. | |
| b5 4-BIT SOFTWARE QUAD. ACCUM. | |
| b4 4-BIT SOFTWARE DATA ACCUM. | |
| a4 PHASE ERROR REGISTER | |
| a3 HARDWARE QUAD. ACCUM. | |
| a2 HARDWARE DATA ACCUM. | I/O |
| a0 MODE REGISTER | |

FIG. 10

| NON-DECODER FUNCTIONS | |
|---|---|
| PACKED BIT BUFFER | |
| DATA SIGNAL BIT VALUES BUFFER | |
| MISC. DECODING FUNCTIONS (e.g. BCH CHECKING, SYSTEM DCC, BARKER REGISTER, etc.) | RAM |
| b13 PHASE CORRECTION DATA | |
| a12 PHASE CORRECTION COUNTER | |
| a10 DCC BIT COUNTER | |
| b9) WORKING REGISTERS — MISC. DECODING USES b8) | |
| b7 BASE ADDRESS FOR CURRENT WORD, DATA SIGNAL BIT VALUES BUFFER | |
| b6 CURRENT ADDRESS IN DATA SIGNAL BIT VALUES BUFFER | |
| a5 BIT COUNTER | |
| a4 BARKER TIMEOUT COUNTER | |
| a0 WORD REPEAT COUNTER FOR DATA COLLECTION * BIT ACCUMULATOR FOR DCC CHECK | |
| I/O HARDWARE FUNCTIONS | |

DATA DETECTOR USING PROBABALISTIC INFORMATION IN RECEIVED SIGNALS

BACKGROUND OF THE INVENTION

This invention relates to a data decoder; and it relates, more particularly, to a decoder which operates to utilize probabilistic information in a received signal for facilitating the extraction of information therefrom.

In a data transmission system, the character of a fading transmission medium per se and the character of noise and interference, which are likely to be superimposed on a signal during transmission through that medium, tend to make it difficult to extract information from a received signal. For example, intersymbol interference tends to blur information representative states of adjacent data bits; and an electromagnetic noise burst can combine with a data signal to change partially, or completely, the originally transmitted binary information state of the data signal portion affected. Various techniques are known in the art for operating in the presence of these conditions to extract synchronizing information and/or reasonably intelligible data information from received signals. Some examples of those techniques are identified below; but in a fading channel, and particularly when FM modulation is used, these all employ so little of the available probabilistic information that error rates are excessively high and thus impede rapid, useful, information throughput.

A U.S.A. Pat. No. 3,341,658 to Kaneko discusses the use of a maximum likelihood technique for synchronizing signal recovery vis a vis data message information recovery. For that purpose, there are employed a matched filter, a waveform generator representing a log function of a priori probability of the synchronizing time point, a combiner for adding the waveform output of the generator to a correlation filter output to enhance the correlation output at a time when the probability of the synchronizing time point occurrence is large, and a detector for indicating when the combined output is above a fixed detection level.

A U.S.A. Pat. No. 3,633,107 to Brady shows an adaptive signal processor for diversity radio receivers and using a transversal filter to process analog signals in a space diversity system wherein the summed tap outputs are fed back to control tap multipliers for tap signal weighting.

A U.S.A. Pat. No. 4,029,900 to E. J. Addeo, shows an example of a timing recovery system for noisy, fading, multipath channels of a mobile radiotelephone system. The recovery system of the patent employs both analog techniques, to derive approximate bit phase information, and digital techniques, to derive from the approximate information more precise phase information to be used in digital logic for synchronizing word detection.

Another U.S.A. Pat. No. 4,242,755 to Gauzan deals with an arrangement for decoding digital signals and in which multiple samples of each incoming bit signal are taken. The samples are processed to distinguish between binary ONE and binary ZERO bits by detecting the relative numbers of samples in each such bit state during a single bit time.

It is also known in post-detection maximal-ratio signal combining arrangements to employ signal weighting in the output of each received signal branch. The weighting is accomplished by a measure of the output signal-to-noise ratio, as taught by W. C. Jakes at pp. 390-395 in *Microwave Mobile Communications*, published 1974 by John J. Wiley and Sons, Reading, Mass.

SUMMARY OF THE INVENTION

In accordance with the present invention, multiple versions of data signal values are weighted according to a predetermined information utility criterion to enhance the decoding effect of samples which are most likely to contain reliable information. The weighted samples are accumulated over a predetermined time interval. Data information states are determined from the accumulations.

In one embodiment, multiple weighted sample versions of each bit of a received data signal are weighted according to their log likelihood ratio and are arithmetically accumulated over a bit-time interval of the signal to determine a value for that data bit.

In another embodiment, corresponding received versions of a data bit value in multiple repetitions of a data message are weighted according to the received signal strength at the time of reception of each bit version; and the weighted bit amplitude values are arithmetically accumulated to produce a value from which the data binary bit state is determined.

The foregoing types of accumulation, i.e., within a bit interval and over a predetermined plurality of repetitions of that bit, are also advantageously utilized together to produce a data bit value from which the bit binary information state is determined.

BRIEF DESCRIPTION OF THE DRAWING

A more complete understanding of the invention and the various features, objects, and advantages thereof can be obtained from a consideration of the following Detailed Description and the appended claims in connection with the attached drawing in which:

FIGS. 9 and 10 are memory maps of random access memory in the FIG. 3 decoder.

DETAILED DESCRIPTION

Figure 1:
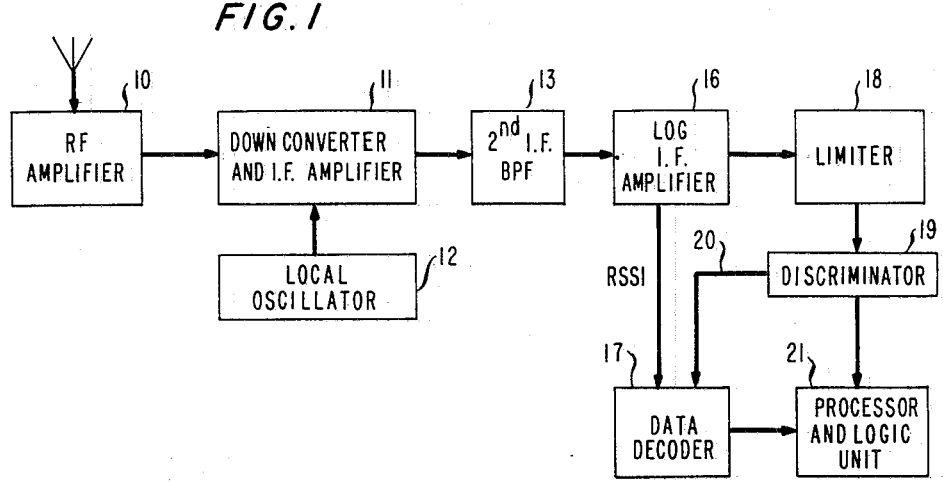
FIG. 1 is a block and line diagram of a radio receiver utilizing a data decoder in accordance with the present invention.

In FIG. 1, there is shown one type of radio receiver in which the present invention can be employed. That receiver is useful in a cellular, channel reuse, mobile, radiotelephone system such as that which is the subject of the January 1979 issue of the *Bell System Technical Journal*, Vol. 58, No. 1. The illustrated receiver is similar to one shown in FIG. 7 of a paper entitled "Advanced Mobile Phone Service: A Subscriber Set for the Equipment Test", by R. E. Fisher, and appearing at pp. 123-143 of that journal. Although the Fisher article depicts a receiver for a mobile unit, receivers for a fixed station at an antenna cell site, or base station, include essentially the same functions.

A radio frequency (RF) amplifier 10 schematically represents the input band limiting and RF gain functions typically found in the radio frequency portion of a receiver such as the one illustrated. Down converters and intermediate frequency (IF) amplifier 11 and local oscillator 12 represent the typical operations of two stages of frequency mixing, cooperating with an intermediate stage of IF amplification, to reduce the signals to a second IF frequency level at which a second-IF bandpass filter 13 is employed for selecting a desired channel from the total band of down-converted frequencies. Output signals from filter 13 are applied to an input of a log-IF amplifier 16 which includes a cascade of progressively saturating differential amplifiers. Diode detectors are connected at the output of each differential amplifier stage; and outputs from these detectors are summed in a network providing a log-amplifier output voltage which is here designated the received signal strength indicator (RSSI).

The RSSI voltage is one which rises comparatively smoothly and monotonically over an input signal range of e.g., −110 to −30 dBm, as measured at the antenna feeding RF signals to the receiver. That RSSI voltage is applied to one input of a data decoder 17 in accordance with the present invention, as well as being utilized for other functions not necessary to the disclosure of the present invention, but discussed in the aforementioned Fisher paper.

Amplified second IF signals from filter 13 and amplifier 16 are applied through a limiter 18 to an input of a frequency discriminator 19. That discriminator operates at the second IF, i.e., at the center frequency of the selected channel at the second-IF frequency level. Output signals from discriminator 19 are at the baseband frequency level and are applied by way of a circuit path 20 to a data signal input of the decoder 17. Output from discriminator 19 is further applied to an input of processor and logic unit circuits 21 for further utilization in accordance with the normal radio receiver functions. An output of the decoder 17 is also applied to the circuit 21 for providing data message information to the logic unit portion thereof.

The particular details of the receiver of FIG. 1 are not important to an understanding of the present invention since, as will subsequently appear more clearly, the illustrative data decoder 17 requires only an RSSI input signal of the type described and a baseband data signal input, such as is provided on the circuit path 20, in order to produce a relatively low-error output data signal for the receiver control circuits such as the processor and logic unit circuits 21.

In a cellular mobile radiotelephone system of the type described in the aforementioned issue of the *Bell System Technical Journal*, data messages are transmitted from a radio transceiver unit operating either on a voice channel, by a technique which has come to be called a blank-and-burst technique, or on a duplex control channel sometimes called a set-up channel. In either case, data messages from a mobile unit are transmitted in a short burst of data signals at a bit rate above the voice frequency band. The burst length is so short that it is essentially undetectable by a voice channel user of the transceiver.

Data on the radio frequency channels is phase- or Manchester-encoded. The system standard for this encoding is at a 10-kilobit-per-second transmission rate so that each bit cell is 100 microseconds in length. A binary ONE bit is represented by a waveform portion having a low-to-high transition in the center of the bit cell, and a binary ZERO bit is represented by a portion having a high-to-low transition in the center of the bit cell.

Figure 2:
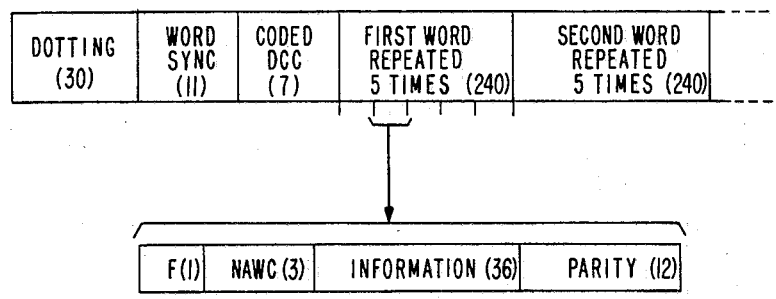
FIG. 2 is a diagram of illustrative data message and word formats.

FIG. 2 includes a diagram of an illustrative data message of one type which is advantageously processed by the illustrated decoder. This message includes a preamble dotting sequence, alternately ONEs and ZEROs, which is typically of 30 bits duration. Following the dotting sequence is an 11-bit Barker word synchronization character; and that is, in turn, followed by a 7-bit digital color code field (used by the system to distinguish between valid messages and those caused by interference from distant users) and a series of five repetitions of each of a plurality of 48-bit data words. As also shown in FIG. 2, each 48-bit word includes a message shart bit F, three bits indicating the number of additional words coming (NAWC), a 32-bit information field, and a 12-bit parity-error-detection-correction byte. Each 48-bit word is repeated five times.

Figure 3:
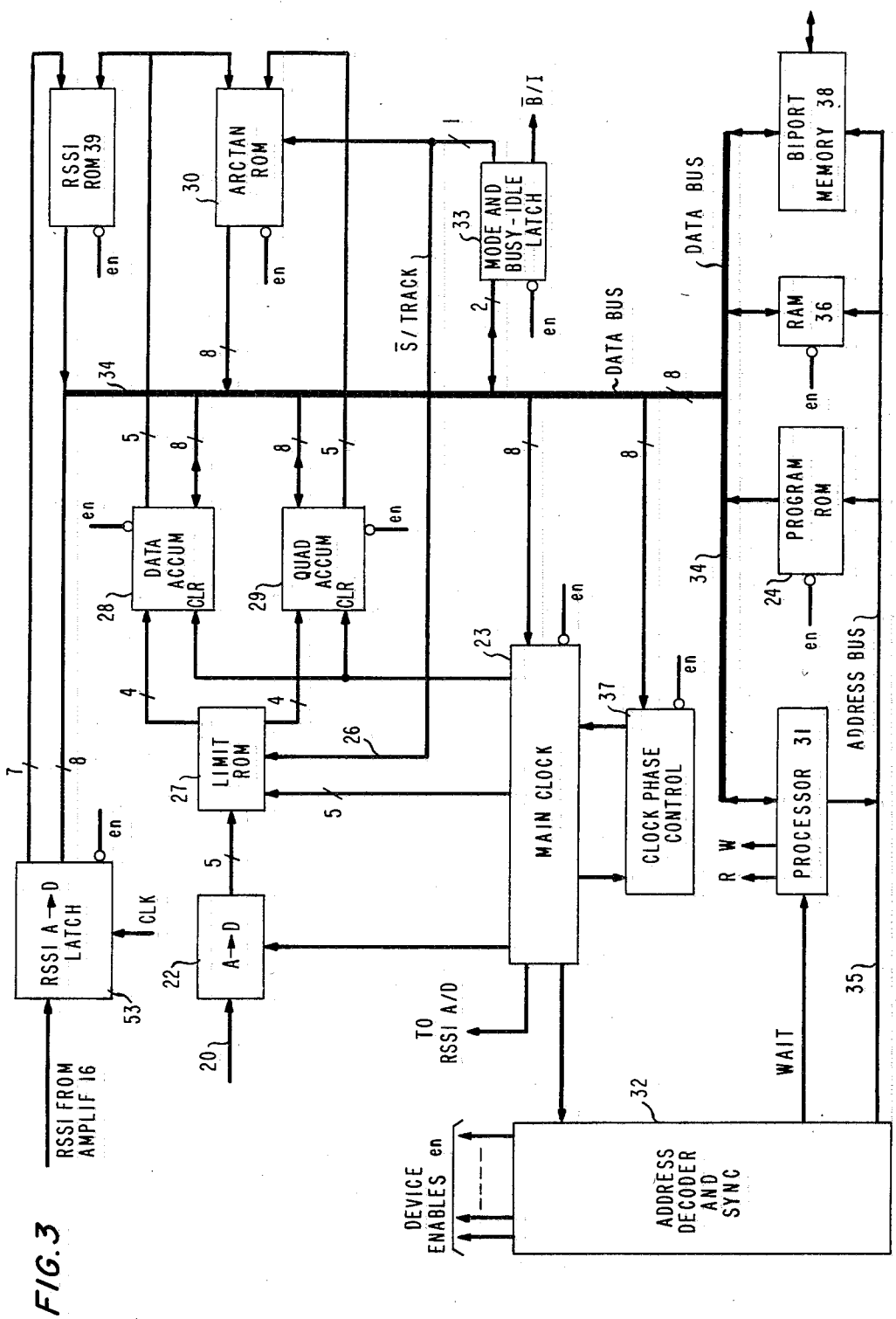
FIG. 3 is a block and line diagram of a data decoder useful in FIG. 1.

The FIG. 3 decoder, illustrating certain aspects of the invention, operates by weighting different versions of the received data signal according to at least one predetermined utility criterion, averaging the weighted versions, and extracting digital data information from the average. Weighting is performed in accordance with predetermined criteria related probabilistically to the relative usefulness of the versions of the received data signals. Such probabilistic considerations can be applied with different intensities according to the goals of the designer. However, to illustrate the invention, a relatively intense application is shown.

In such an application, it has been found convenient to use memory translations driven by relevant decoder parameters to perform decoder functions such as two different types of weighting, and the derivation of digital phase error signals for decoder clock control. One advantage of the memory-type of function generator, or translation, is that it produces the aforementioned weighted sample trains on the rapid real-time basis, a result which could be difficult to produce if the indicated functions were recurrently computed at the required rate.

In FIG. 3, incoming analog data signals on lead 20 from the discriminator 19 are applied to an analog-to-digital converter 22. In that converter, the analog signals are periodically sampled under the control of signals from a master clock 23 at a rate which is substantially higher than the bit rate of the data signals. For example, in an embodiment for the indicated 10-kilobit data rate, the converter 22 samples the data signals at a 640-kHz sampling rate so that there are produced 64 samples per bit cell, or bit time. Converter 22 produces two samples per clock address supplied to ROM 27. Converter 22 produces 5-bit, binary-coded, sample, output words which are applied as successive partial address inputs to a read-only memory (ROM) 27. Additional cooperating address inputs include 5-bit clock words from a main clock 23 and occurring at 32 times the incoming data bit rate, and a mode control bit on a lead 26.

The ROM 27 is employed to perform a sample signal translation illustratively involving at least two functions. By way of preliminary summary, one of these functions, employed in the search mode, is the performance of a part of a quadrature receiver function in which the data signal is split into an in-phase, or data, component and a quadrature component. This is achieved by multiplying the received data sample wave by sine ωt and cosine ωt, where ω=2πF is the data bit rate. (F=5000, i.e., half the normal bit rate due to the alternating ZERO-ONE bit sync sequence.) An additional ROM 27 function, employed in both the search and the locked modes (but with different detailed characteristics), weights both the in-phase, or data, sample train and the quadrature, or first derivative, sample train to enhance certain intermediate amplitude ranges thereof. That enhancement limits the decoding effects of high- and low-amplitude ranges thereof so the ROM 27 is sometimes called a limit ROM. In one illustrative embodiment, to be described, the limiting is advantageously based on a probabilistic, or maximum likelihood, weighting of received data samples in consideration of known characteristics of the signal transmission channel and the influence of those characteristics on intersymbol interference in the received data signal.

The purpose of the locked-mode amplitude enhancement, i.e., the limiting function, is to increase the effect on the decoding operation of those data signal samples which are most likely to contain valid information by weighting such samples. The weighting applied is a function of the degree of similarity of the received amplitude, in each given phase of a bit time, to a predetermined likely amplitude that a bit of the same binary type would have had if transmitted through the same path with only the normal attenuation and the applied signal processing (such as amplification, filtering, and equalization), independently of noise or other spuriously injected distortions. In the search mode, the operation is similar in that the effects of, e.g., frequency modulation "clicks" are suppressed; but the limiting operation is independent of clock phase.

Figure 4:
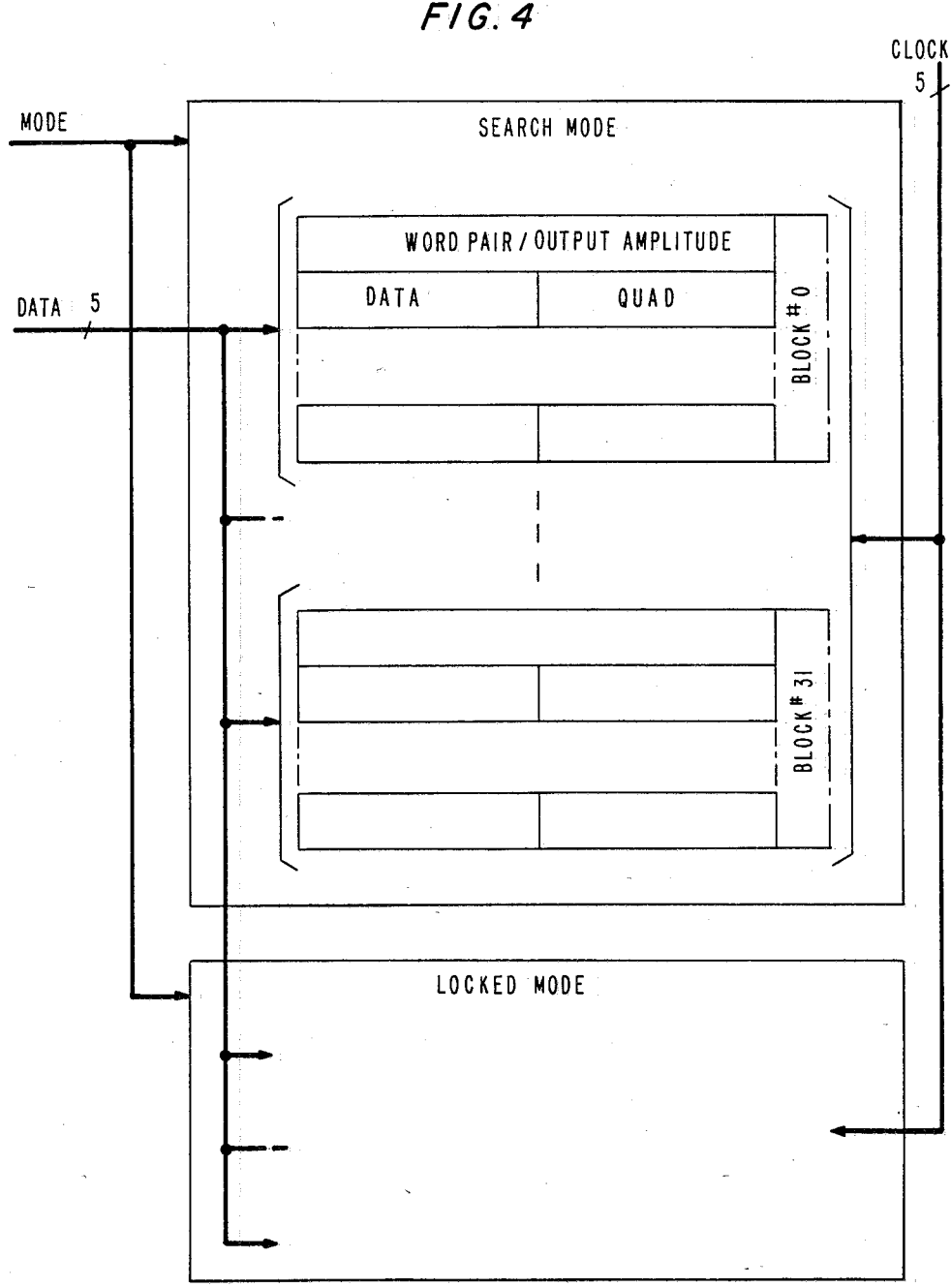
FIG. 4 is a memory map for a translation memory utilized in FIG. 3.

FIG. 4 is a memory map of ROM 27 shown in association with the mode, data, and clock addressing circuits. ROM 27 stores separate sets of translation words representing sample amplitude values for the mentioned search mode and locked mode operations, as will be described. Each translation value is a word pair that includes a true data value and a quadrature value as shown in FIG. 4. For reasons that will become apparent, those values are arranged so that there is a different block of such values for each of the 32 sample phases of a data bit interval. Separate 32-block sets of word pairs are provided for the search mode and the locked mode, respectively. As already outlined, the function of those stored translation values is to convert input data signal samples into corresponding sets of true and quadrature data values which are weighted to enhance the decoding effect of those received signal amplitudes which are most likely to represent useful information or, conversely, to limit the effect of those amplitudes least likely to represent useful information.

The aforementioned weighting can be accomplished in different ways, from the purely arbitrary to the highly sophisticated. The latter is the most difficult to implement, and it will be described here. Expressions for true values $D_s$ and quadrature values $Q_s$ of a ROM 27 word pair of the search mode, i.e., a dotting sequence of periodic data information content, are:

$$D_s(t,v) = [k_s \cos \theta_t Z(v)]$$

$$Q_s(t,v) = [k_s \sin \theta_t Z(v)]$$

wherein the brackets [] denote the operation of fixing to integers, i.e., fixing in the Fortran sense so that for $-1 < x < 1$, $[x]=0$; for $1 \leq x < 2$, $[x]=1$; $-2 < x \leq -1$, $[x] = -1$, etc. so that symmetry is preserved. $k_s$ is a gain scaling factor chosen so that the D and Q ranges of values occupy the full range of 4-bit two's complement integers, i.e., from $-8$ to $+7$. $Z(v)$ is a limit function comprising a ratio of the time average of conditional expectation density of the sample voltage v at time t, conditioned on the observed value of v, to the time average probability density of the observed value of v at time t.

To define the limit function $Z(v)$, one performs the following steps:

1. Compute $\bar{\gamma}(t)$ the instantaneous signal-to-noise power ratio, and $\omega(t)$ frequency deviation at the IF output for a signal consisting of all dotting at the minimum operational carrier-to-noise power ratio.

2. Compute the IF moments $b_{2c}$, $b_{oc}$, assuming that the IF filter is symmetric about some carrier frequency which, for convenience of notation, is translated to 0. Defining $H_{IF}(\lambda)$ as the IF filter transfer function at radian frequency $\lambda$, the central moments about the carrier frequency are:

$$b_{nc} = \frac{1}{2\pi} \int_{-\infty}^{\infty} \lambda^n |H_{IF}(\lambda)|^2 d\lambda$$

where the "c" on the subscript denotes a central moment. Evaluating this integral for n=0 and 2 gives typical values for the described application of $b_{oc} = 28800$ Hz, and $b_{2c} = (2\pi)^2$ a mid-line-height period; $1.347 \times 10^{12}$ (radians/second)$^2$ Hz.

3. Compute the mean discriminator output $\theta'(t)$ and scale factor defined by the average absolute discriminator output deviation $$S(t) = E\{|\theta'(t) - \overline{\theta'(t)}|\}$$

(both in radian/sec.) by $$\overline{\theta'}(t) = \omega(t) \cdot \frac{\bar{\gamma}(t)}{1 + \bar{\gamma}(t)}$$

and $$S_2(t) = \frac{b_{2c}/b_{oc}}{1 + \bar{\gamma}(t)} + \frac{1}{\bar{\gamma}(t)} \left( \frac{\bar{\gamma}(t)\omega(t)}{1 + \bar{\gamma}(t)} \right)^2.$$

Note that the discriminator output in radians/second, $\theta'$, is related to the physical discriminator voltage output by $$v = \frac{g}{2\pi} \cdot \theta'$$

where g, is the known discriminator sensitivity in volts/Hz.

4. Compute the probability distribution:

$$p_d(\theta'|\omega(t),\overline{\gamma(t)}) = \cfrac{1}{2S(t)\left[1 + \left(\cfrac{\theta' - \overline{\theta}'(t)}{S(t)}\right)^2\right]^{3/2}}.$$

5. Compute the value of the limit function Z(v) by:

$$Z(v) = \cfrac{\int_0^T p_d\left(\cfrac{2\pi v}{g} \middle| \omega(t), \overline{\gamma(t)}\right) \cdot \overline{\theta}'(t)dt}{\int_0^T p_d\left(\cfrac{2\pi v}{g} \middle| \omega(t), \overline{\gamma(t)}\right) dt}$$

for v taking successively the different voltages corresponding to the discriminator analog-to-digital converter output. T is the duration of one bit cell.

Figure 7:
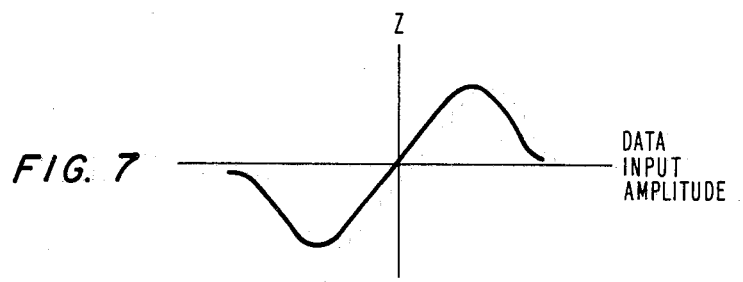
FIGS. 7 and 8 are generalized likelihood characteristics useful in describing the invention.

Z(v) accomplishes a weighting function having a characteristic of the type illustrated in FIG. 7, which is a plot of weighted amplitude Z versus data input amplitude. There are identical data and quadrature versions of such characteristic for each sampling time phase of a data bit interval, and a block of word pairs in FIG. 4 defines that pair of characteristics for one such time phase. Peaks in such a characteristic are at points on the abscissa of the greatest probability of information usefulness, so input data of the same polarity as a peak, and of amplitude corresponding to the abscissa location of that peak, are weighted most heavily.

For locked mode, the limit ROM contents are computed by the following steps:

1. Recall the IF moments $b_{oc}$, $b_{2c}$ used in Step 2 of the search mode computation, and choose the carrier-to-noise power ratio at the lowest value where operation is desired.

2a. Choose a multibit sequence . . . , '1', . . . where a conditioning i.e., central, bit is a ONE; and where . . . represents the bits preceding and following the '1' bit in question. For most practical IF amplifiers, it is sufficient to consider two or three bits on each side of the conditioning '1' bit.

2b. For this sequence, compute w(t) and $\overline{\gamma}(t)$ taking successively the different sample times during the bit in question.

2c. Compute $\overline{\theta}'(t)$ and S(t) as before.

2d. Compute $p_d(\theta'|\omega(t), \overline{\gamma}(t), '1')$ as in step 4 search mode.

Here the conditioning variable '1' is the central '1' bit of step 2a.

3. Repeat steps 2a–2d for all possible step 2a combinations of adjacent bits.

4. For each of the different sample times t, during the '1' bit, and for each of the discriminator output levels $\theta'$, average the probability density functions obtained in steps 1–3. This gives:

$$\overline{p}_D(\theta'|t, '1').$$

Obtain a similar density conditioned on a "zero" bit:

$$\overline{p}_d(\theta'|t, '0').$$

For Manchester encoded ONE and ZERO bits having symmetric antipodal signaling waveforms, $$\overline{p}_d(\theta'|t, '0') = \overline{p}_d(-\theta'|t, '1').$$

6. Compute the log-likelihood ratios $L_L$ at each sample point as:

$$L_L(\theta',t) = \ln\left(\cfrac{p_d(\theta'|t,'1')}{p_d(\theta'|t,'0')}\right).$$

7. Compute the ROM 27 contents $D_L$ to be read out to the data accumulator 28 input as:

$$D_L(t,v) = \left[k_L \cdot L_L\left(\cfrac{2\pi v}{g}, t\right)\right].$$

8. For the ROM 27 contents $Q_L$ to be read out to the quadrature accumulator 29 input, first compute the partial derivative with respect to time:

$$q_L(\theta',t) = \cfrac{\partial}{\partial t} L_L(\theta',t)$$

for $\theta'$ fixed at the value corresponding to the sample voltage. Then, $$Q_L(t,v) = \left[k'_{qL} \cdot q_L\left(\cfrac{2\pi v}{g}, t\right)\right].$$

In the expression for $D_L$ and $Q_L$, the brackets denote the fixing of integers; and $k_L$ and $k'_{qL}$ are gain constants chosen so that values of D and Q occupy the full range of 4-bit two's complement integers. $L_L$ is the log likelihood ratio of the probability density for a single sample of decoder input, averaging over the effects of intersymbol interference, given that a binary ONE is transmitted, to the corresponding density given that a binary ZERO is transmitted. That log likelihood ratio and its first derivative each produce characteristics of weighted amplitude versus input data amplitude similar to those already described in connection with FIG. 7 for respective sampling time phases of a bit interval. The significant differences between the characteristics for Z(v) and those for $L_L$ and its first derivative are that, in $L_L$, the peak locations change during a bit cell, whereas in Z(v), no phase relation between data and clock is assumed; hence, the shape remains constant.

Figure 8:
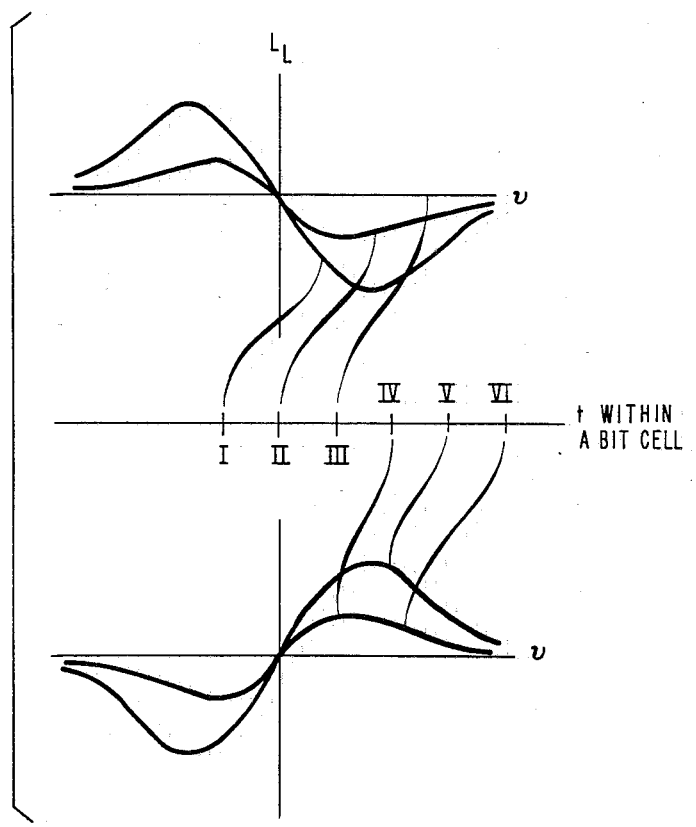

Typical characteristics of $L_L(v,t)$ are shown for different t (I through VI) in FIG. 8. For the locked mode data accumulator and the Manchester encoded data, the log likelihood ratio $L_L(v,t)$ is zero for t at the center of the bit (III) independent of the input voltage v. Its extremes occur approximately at the one-quarter (I) and three-quarter (V) time points of the bit cell. Characteristics (IV) and (VI) show that the $L_L$ peaks become smaller and shift toward smaller values of v for bit times on either side of the one-quarter and three-quarter points of a bit cell.

The weighted data and quadrature samples in ROM 27 are to be used to derive phase information for the purposes of locking the phase of the local main clock 23 to the phase of the incoming data in the search mode and, thereafter in the locked mode, tracking that locked phase relationship. The respective trains of data and quadrature samples are applied to different accumulators 28 and 29 wherein the samples are accumulated over successive intervals, each interval being equal to the duration of one received data bit interval. Thus, the data accumulator and quadrature accumulator outputs each includes a 5-bit digital value for each received data bit. The accumulator 28 and 29 outputs are applied by way of a data bus 34 to a processor 31, in which the accumulated bit values are further accumulated and otherwise processed, in a manner to be described, for use in conjunction with an arctangent ROM 30 to obtain indications of the relative phase between the received data and the operation of the decoder clock system.

Processor 31 is advantageously one of the faster microprocessors presently known in the art such as the BELLMAC TM-8 microprocessor 212 series made by the Western Electric Company and described in, for example, "A CMOS Microprocessor for Telecommunications Applications" by J. A. Cooper et al., 1977 *IEEE International Solid-State Circuits Conference*, pp. 138–139. Other examples of such microprocessors include the Z8000 microprocessor of the Zilog Corp., the MC68000 microprocessor of the Motorola Corp., and the DEC LSI 11 microprocessor of the Digital Equipment Corp. Each of these is fast enough to control a decoder for operation on a time-shared basis to serve multiple channels if a particular application can make use of that capability. Since such processors and their use are well known in the art, the present description will be directed to those aspects which are useful for control of the illustrated decoder.

Processor 31 engages in information communication with various devices of the decoder by way of the data bus 34. Device selection is achieved by way of an address bus 35 extending from processor 31 to an address decoder and synchronizing circuit 32, to be described, which extends individual enable signals en to the various devices. Processor 31 also provides read and write control leads R and W to all such devices for use in conjunction with the enable signals. Processor program resides in a program ROM 24 situated between the address bus 35 and data bus 34 along with a random access memory (RAM) 36 and a biport memory 38.

Figure 5:
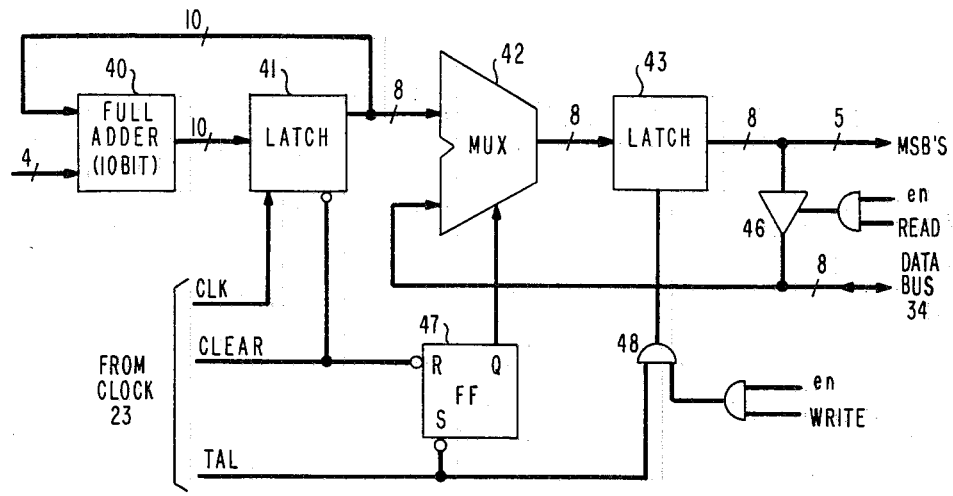
FIG. 5 is a diagram of an accumulator used in FIG. 3.

Before proceeding further with a general description of FIG. 3, it is useful to consider the accumulators 28 and 29 in greater detail shown in FIG. 5. Each accumulator is advantageously constructed as there shown. Four-bit words from ROM 27 are applied to one input of a full adder 40 which has a ten-bit output. That output is overwritten into a first multibit latching register 41 each time the input thereof is enabled by a clock signal from main clock 23 at the 640-kHz rate used to drive the analog to digital converter 22. That signal is one of three provided periodically in the three-bit circuit from clock 23 to the accumulators. The other two signals are a 10-kHz clear signal at the end of each bit time and a transfer accumulator to latch (TAL) signal also at the end of each bit time but leading the clear signal slightly, e.g., by one bit-phase-rate clock period. The full ten bits of the latch output are coupled back to a second input of the adder 40, and the eight most significant ones of those 10 bits are applied to an input of a multiplexer 42. At the end of each bit cell, or time, the clear signal clears the latch 41 so a new bit time accumulation can begin.

Multiplexer 42 is controlled by a binary selection signal to couple either the output of latch 41 or a snapshot sample from data bus 34 to the input of a second multibit latch 43. The selection signal is provided from the Q output of a set-reset flip-flop 47 each time that the leading, negative-going, edge of the TAL pulse sets the flip-flop. That selection causes the output of latch 41 to be sampled. The next following clear pulse resets flip-flop 47; so at all other times the signal states on data bus 34 are applied through multiplexer 42 to latch 43. Latch 43 is enabled to be loaded from the data bus at those times when the TAL signal is positive. Latch 43 is loaded in response to coincidence of a WRITE pulse from processor 31 with an enable signal from synchronizing circuit 32. Other circuits in FIG. 3 which receive the data from, or deliver data to, processor 31 are similarly responsive to a READ or a WRITE signal from processor 31.

Eight output bits from latch 43 are continuously available. The five most significant ones of those eight bits are similarly applied to different inputs of the arctan ROM 30 from the two accumulators, respectively. Those same five bits from data accumulator 28 are also applied to an input of an RSSI ROM 39, to be described. All eight bits are coupled through a tri-state buffer 46 to the data bus 34 whenever that buffer is enabled by a coincidence of a READ signal and signal from the address decoder and synchronizer 32 in FIG. 3.

Figure 6:
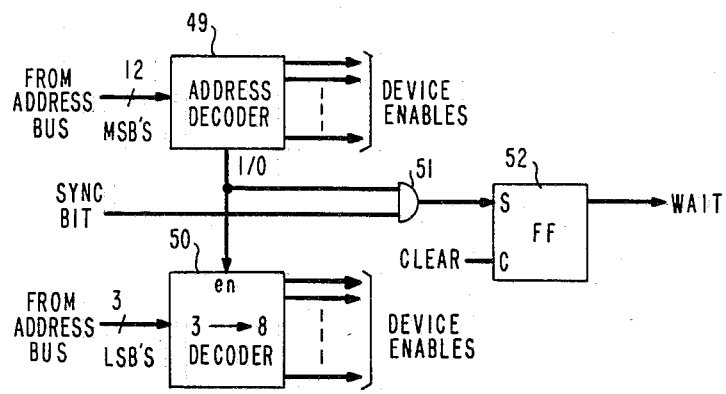
FIG. 6 is a more detailed diagram of the address decoder and synchronizing circuit of FIG. 3.

FIG. 6 depicts additional detail of the synchronizer 32. Twelve of the most significant bits from the processor address bus 35 are applied to an address decoder 49 which activates corresponding ones of its output leads to provide device enabling signals en to corresponding ones of the RAM 36 or the ROMs. An additional three least significant bits from the address bus 35 are applied to a three-to-one-out-of-eight decoder 50 which, when enabled by an input/output (I/O) control bit from decoder 49, provides corresponding device enables en for processor I/O related devices such as hardware registers, accumulators, latches, and clocks.

The decoder 49 I/O bit is also extended to an AND gate 51 which is activated on coincidence of that bit with a synchronizing bit that is also provided on a predetermined conductor in the address bus 35. Output of gate 51, when activated, sets an edge-triggered flip-flop circuit 52 to provide a WAIT signal to processor 31 indicating that some I/O operation is working, and further processing should be temporarily halted. At the end of the current bit time cell, the clear signal previously mentioned resets flip-flop 52 to remove the WAIT signal.

In the search mode of FIG. 3 decoder operation, the dotting train of alternate binary ONE and ZERO bits is anticipated as a preamble to a data message. Accordingly, the foregoing processing of the outputs of the accumulators 28 and 29 produces data and quadrature sample accumulations which, together, can be shown to be indicative of the magnitude of phase error at those times. An arctangent ROM, designated arctan ROM 30, when addressed by the latter accumulations, provides translations producing the corresponding phase error magnitude values in radians expressed digitally. When the dotting condition has been detected in the search mode, or periodically when in the tracking mode, the processor returns the running accumulations, which it has determined, of accumulator outputs to the respective accumulators by way of multiplexer 42 and latch 43. At the same time, processor 31 enables the output of the arctan ROM 30, which is addressed by the combined outputs of those accumulators.

Like the likelihood or limit ROM 27 with which it is closely associated, the arctan ROM 30 contains distinct tables for search and track mode selected by the same search/track address line 26. In both modes, the arctan ROM 30 serves to compute functions of two variables by direct table look-up techniques. In addition to the search/track line 26, its address consists of the five most significant bits from the data accumulator output and the five most significant bits from the quadrature accumulator output.

In the search mode, the arctan ROM is used to compute the phase difference between the incoming data stream and the main decoder clock. Note that in this mode the clock has been free running at the nominal data frequency so that no a priori phase relationship is assumed. The decoder processor 31 computes at time t the software accumulations:

$$X_t = \sum_{n=0}^{27} (-1)^n \cdot D(t-n)$$

and $$Y_t = \sum_{n=0}^{27} (-1)^n \cdot Q(t-n)$$

over the 28 preceding bit cells. (Recall that the dotting sequence is 30 bits long, so 28 allows time to set the clock). Here, $D(t-n)$ and $Q(t-n)$ represent the data and quadrature accumulator outputs n bits before the present (i.e., time t). The $(-1)$ similarly represents an alternating add-subtract operation used so that the result of $X^2+Y^2$ in a dotting sequence increases in magnitude. The squared magnitude $X^2+Y^2$ is used to detect dotting. Once dotting is detected, the accumulations X and Y are written back into the data and quadrature accumulators, respectively, where they serve as address data for the arctan ROM 30. It may be shown by elementary methods that the phase difference between the data and clock is:

$$\theta = \left[ \frac{255.5}{2\pi} \bmod\{\pi - 2 \, atan2(Q+.5, D+.5), 2\pi\} \right]$$

where atan2(Y,X) is the two-argument arctangent function. (atan2(y,x) returns atan(y/x) for (x,y) in quadrant 1, or 4, but does not have the ambiguity between quadrants (1,3) and (2,4) which atan(y/x) has. atan2 is a standard FORTRAN function.) The factor $255.5/2\pi$ converts the radian result to the 8-bit binary form used by the main clock. Also, the factor of $-2$ multiplying the atan2 function is a result of setting the main 10-kHz clock with the data from the 5-kHz dotting sequence. $\theta$ is the count which must be deleted from one bit cell to bring the clock into phase with the data; and the expression for $\theta$ defines the different values that are stored in the search mode field of ROM 30.

In the locked mode, the arctan ROM 30 uses the outputs of the data and quadrature accumulators for each bit cell to compute an estimate of the phase error. The contents of this ROM are generated by the following steps:

1. Compute for the minimum operational carrier-to-voice power ratio $\bar{\gamma}$ the information measure:

$$K_o = \int_{-L_{max}}^{L_{max}} f_o(L) \cdot \frac{\partial^2 L}{\partial^2 \phi^2} \, dL$$

for $f_o(L)$ being the probability density function of the log-likelihood ratio L given that a '0' bit was transmitted. $L_{max}$ is the largest possible value of L for the particular circuit configuration. $f_o(L)$ may be obtained analytically by straightforward, but tedious, techniques, or by simulation. Such a simulation encompasses steps 2-6 of the procedure used to generate the limit ROM locked mode table with the addition of pseudo-random noise being added after step 2a, before the IF filtering operation step used to shape w(t) and $\gamma$(t). Here, $\phi$ is the phase misalignment between the data and clock.

2. From the data and quadrature accumulator outputs D and Q, respectively, compute:

$$L = \alpha \cdot (D + 0.5)$$

and $$\frac{\partial L}{\partial \phi} = \beta \cdot (Q + .5)$$

where $\alpha$ and $\beta$ are constants compensating for the range scaling in the limit ROM and the summation and truncation in the accumulators.

3. Compute the a-posteriori probabilities that the bit just received is a 'zero' or 'one' from the given data accumulator output D.

$$p('0' \mid D) = \frac{1}{1 + e^L}$$

$$p('1' \mid D) = \frac{e^L}{1 + e^L}$$

where e is the base of natural logarithms. Note that, by matching (a) the average value of $p('0'|D)$ when a 'one' is actually sent, or vice-versa, with (b) the expected error rate for the selected carrier-to-noise ratio, the constant $\alpha$ may be checked.

4. Compute the phase errors under the two hypotheses (i.e., that the bit received is either a ZERO or a ONE):

$$\hat{\phi}_0 = \frac{-\frac{\partial L}{\partial \phi}}{p('0'|D) \cdot \left(\frac{\partial L}{\partial \phi}\right)^2 + K_o}$$

$$\hat{\phi}_1 = \frac{+\frac{\partial L}{\partial \phi}}{p('1'|D) \cdot \left(\frac{\partial L}{\partial \phi}\right)^2 + K_o}.$$

5. Weight these estimates by the probabilities of the observed data accumulator output:

$$\hat{\phi} = \frac{f_o(L) \, \hat{\phi}_o + f_1(L) \cdot \hat{\phi}_1}{f_o(L) + f_1(L)}$$

where $f_o(1)$ is as in step 1, and $f_1(L)$ is the corresponding probability function assuming '1' is true. With the symmetric Manchester encoding $f_1(L) = f_o(-L)$.

6. $\hat{\phi}$ is scaled, as usual, to the full range of two's complement 8-bit integers, fixed and stored in the ROM.

The arctangent ROM contains values, produced in the manner just described, for converting accumulator output information into a binary-coded digital value which is representative of the arctangent of the phase error of the decoder clock 23 with respect to the received data signals. That phase error information is then transferred by processor 31 control to the clock system including clock 23 in FIG. 3. An illustrative clock system in which clock phase is adjustable in response to binary-coded digital characters representing phase error is shown in my copending U.S.A. patent application Ser. No. 411,531, filed Aug. 26, 1982, entitled "Clock Phase Control With Time Distribution of Phase Corrections," and assigned to the same assignee as the present application. The drawings and text of that application are hereby incorporated herein by reference as though fully set forth herein. Briefly, for the convenience of the reader, at the end of the search mode, the phase error information $\theta$ is directly jam-set, i.e., entered in bit-parallel, into a counter acting as the main clock 23 for instantaneously correcting its phase. Otherwise, during the locked mode of operation, the phase error information $\phi$ is jam-set into a delta, or incremental, counter acting as the phase control circuit 37 in the clock system herein; and that counter is coupled for accomplishing multiple small adjustments in the phase of main clock 23 on an add/delete basis in steps over a time interval that is relatively long compared to the total amount of phase adjustment.

Once dotting has been detected, the processor 31 changes the state of a mode control bit of a 2-bit latch 33 for supplying mode switch information to the limit function ROM 27 and the arctangent ROM 30. The output of the data accumulator 28 is applied, by way of the same outputs used to drive arctangent ROM 30, to a received signal strength indicating (RSSI) weight-combining ROM 39 in FIG. 3 for providing partial address information to that ROM. The remainder of the address information is supplied in the form of a digital representation in each bit time of the RSSI analog signal from the FIG. 1 amplifier 16. An RSSI analog-to-digital converter and latch 53 respond to that analog signal to produce a digital representation that is sampled into an internal 8-bit latch register on each data bit rate clock pulse from clock 23. The seven most significant bits of the digital RSSI signal are used to address ROM 39 each time converter and latch circuit 53 is enabled from synchronizer 32. The full output of the 8-bit latch may be read onto the bus 34 for signal strength measurements and other purposes not directly related to the invention.

In the combiner ROM 39, each data bit value is weighted according to the received signal strength of the receiver at that time. The RSSI weighting ROM contents are generated by the following steps which are appropriate for a noise-limited system. It is assumed that the RSSI signal represents the total power (signal+noise) at the IF output and is expressed in dbm.

1. Compute the signal-to-noise ratio $\gamma$:

$$\gamma = \frac{10^{(\frac{RSSI}{10})} - N_R}{N_R}, \quad RSSI = A + B \cdot NRSSI$$

where $N_R$ is the receiver noise output power in mulliwatts, A and B express the receiver RSSI calibration characteristic, and NRSSI is a multibit binary representation of the RSSI voltage at the address inputs of ROM 39.

2. Compute the extreme likelihood for the given signal-noise ratio $L_{max}(\gamma)$ by the formulae:

$$L_{max}(\gamma) = 2 \cdot \sinh^{-1}\left( \gamma \sqrt{\frac{g}{1 + \gamma(1 + g)}} \right)$$

where $$g = \frac{b_{oc}}{b_{2c}} \cdot \omega_{max}^2$$

($b_{oc}$, $b_{2c}$ as before, $\omega_{max}$=peak deviation (at IF output) in radians/second); and $\sinh^{-1}$ is the inverse hyperbolic sine function.

3. Compute the weight generator output $$RSSIWT(NRSSI, D) = [k_w \cdot L_{max}(\gamma) \cdot (D + .5)]$$

where $k_w$ is such that $$|RSSIWT| \leq \frac{2^{15} - 1}{5}$$

for RSSI=max, and D=15. The factor of 5 in the denominator comes from the fact that five repeats are used in the illustrative system.

This calculation is done for $$D = -16, -15, \ldots, 0, \ldots, +15$$

and $$NRSSI = 0, 1, \ldots, 127$$

to obtain the values of RSSIWT to be stored in ROM 39 for the various combinations of NRSSI and accumulator 28 outputs in their ranges of possible values.

The ROM 39 output is sampled in each bit time by an enabling output of synchronizer 32 and applied to the processor 31 by way of the data bus 34. Processor 31 determines, in the locked mode, that a word synchronization code is present, i.e., by detection of the occurrence of a Barker synchronizing character, and by detection of a digital color code (DCC) bit sequence. These indicate the start of a data message, and in latch 33 a busy-idle signal (B/I) bit is changed to announce to processor and logic unit 21 in FIG. 1 that the channel is busy. The processor separately accumulates, and stores in a random access memory (RAM) 36, for the respective bits of each data word, the weighted bit values of the multiple repetitions thereof.

In the illustrative embodiment, it is assumed that five repetitions of each data word are advantageously utilized. Upon accumulation of five weighted digital bit values, as described, the sign bit of that accumulated value is taken to be the maximum likelihood binary signal state of the received data bit. Taking the sign of the accumulated data signals in this fashion has the effect of averaging the multiple signal versions included in the average because each of the accumulated elements contributes to the end result as a function of their respective amplitudes. The accumulation is, therefore, considered to be an averaging operation from the result of which the data information-representative signal state is determined. That sign binary bit value is then applied by way of the data bus 34, after eight such values have been selected from eight successive five-bit value accumulations to comprise a word, to a biport memory 38 from which the bit values can be extracted by a circuit controller (not shown) for a system which includes the illustrated decoder.

Decoded binary bit magnitude information produced by the decoder is produced with the aid of a microprocessor such as the processor 31 and is, thus, typically represented as a multibit two's complement integer representing signal amplitude for each bit. In accordance with the two's complement sign convention, if this integer is negative, the corresponding message bit is defined to be a binary ONE. Correspondingly, if the integer representation is either of zero magnitude or positive, the message bit is assumed to be a binary ZERO.

Consider now a more detailed presentation of the processor-controlled operation of the FIG. 3 decoder. Processor 31 interacts (by circuits not shown) with a host processor (not shown), such as a cell antenna site, or base station, controller of a system in which the decoder is employed. That interaction is governed by a conventional-type of main program comprising no part of the present invention. Accordingly, the material which follows relates only to a decoding routine that is called from such a main program. That routine is illustratively one that is useful on a reverse setup channel, i.e., in a mobile radiotelephone system, the portion of a setup, or control, duplex channel used for messages received at the cell site from a mobile unit. It will be apparent to those skilled in the art that the decoder can be readily switched to other types of decoding operations by simply specifying corresponding different constants for the various timers and counters, a well-known program control function, without the need to alter the contents of ROMs 27, 30, or 39.

The processor 31 advantageously controls in RAM 36 certain locations dedicated for use in various processor functions. Those locations are indicated in partial memory maps of RAM 36 shown in FIGS. 9 and 10 for the search and locked modes, respectively; and they represent sufficient registers, counters, and timers to permit operation of the decoder in the manner hereinbefore outlined and hereinafter described in more detail. That operation is illustratively represented by a process contemplating the illustrative data message and word format shown in FIG. 2.

In FIG. 9, the upper portions of the map include registers actually in the hardware RAM 36 in FIG. 1. The lower portion includes other hardware external to processor 31 and the RAM 36 but represented in the processor 31 memory address space in a manner equivalent to that of registers actually in RAM 36. Those external registers are designated I/O in FIG. 9 to indicate that they are not physically in the RAM 36 hardware. All of the registers designated 0 through 14 are used in one of two different ways at any given time in the decoder operating process. If the numerical designation is prefixed by the letter a, it indicates that only the least significant 8-bit byte thereof is being used. If the number is prefixed by the letter b, it indicates that both of the 8-bit bytes of the register are available for use in the particular function involved. Similar conventions are employed in the locked mode map of FIG. 10.

Processor 31 operates in an essentially recurrent process while controlling decoder 17 in the detection and decoding of received data messages. That process is illustrated in FIGS. 11–18 insofar as it is useful for teaching the present invention. Process portions relating to many so-called "housekeeping" details, such as timers for checking consistency of system operations as distinguished from timers essential to actual data detection and decoding, are omitted in order to facilitate an understanding of the invention by the reader.

Figure 11:
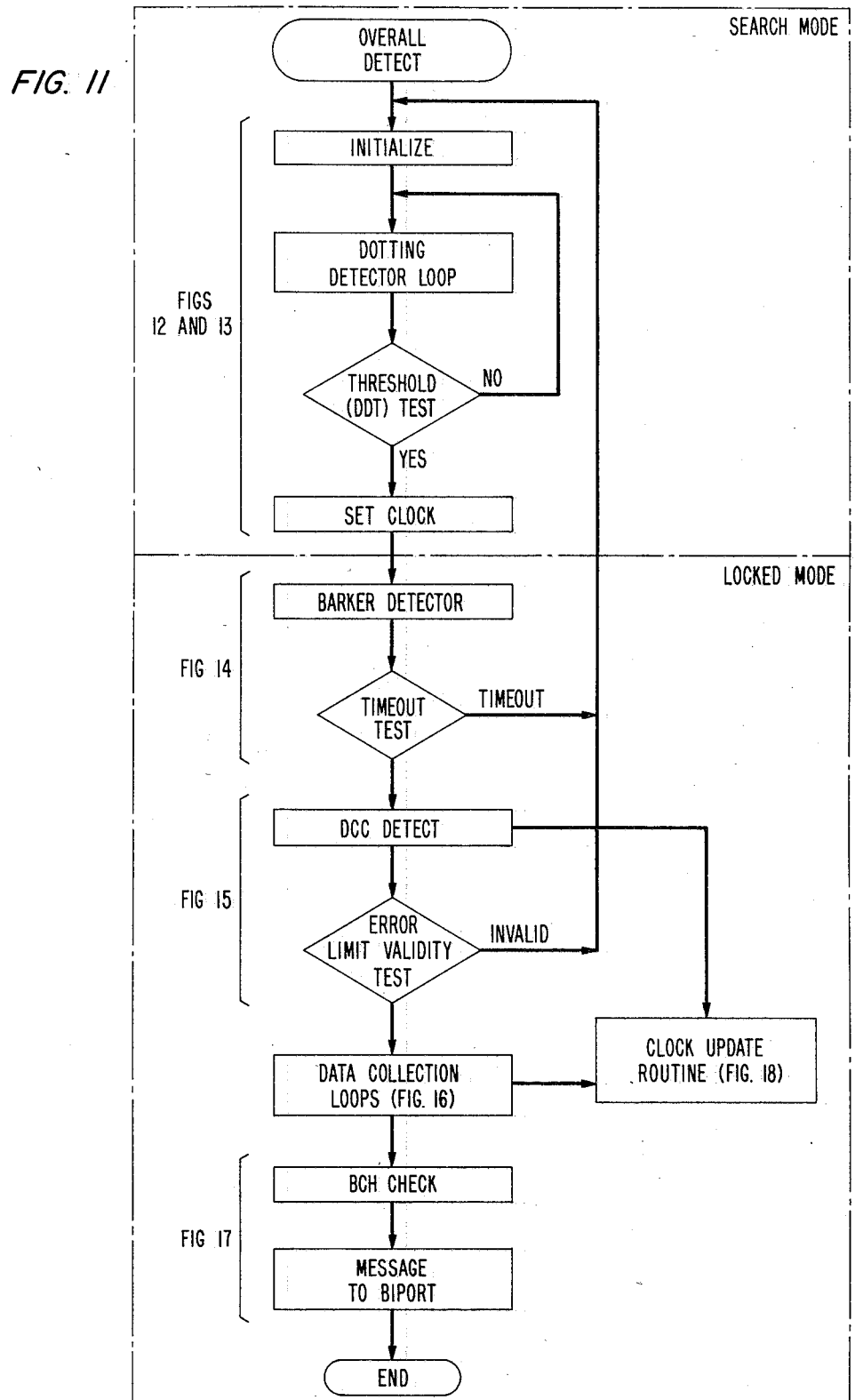
FIGS. 11-18 are process flow diagrams illustrating operation of the FIG. 3 decoder.
Figure 16:
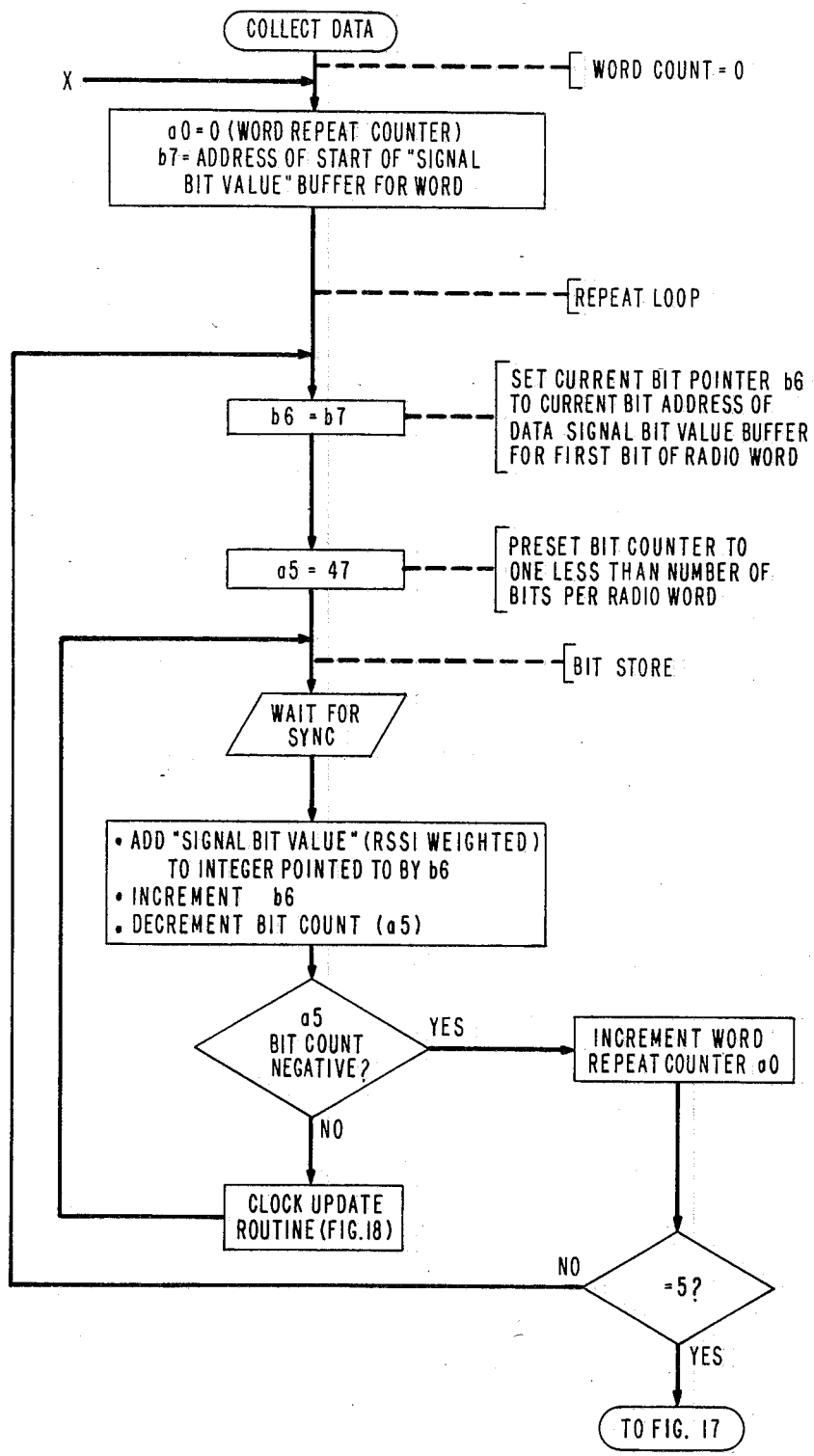
Figure 17:
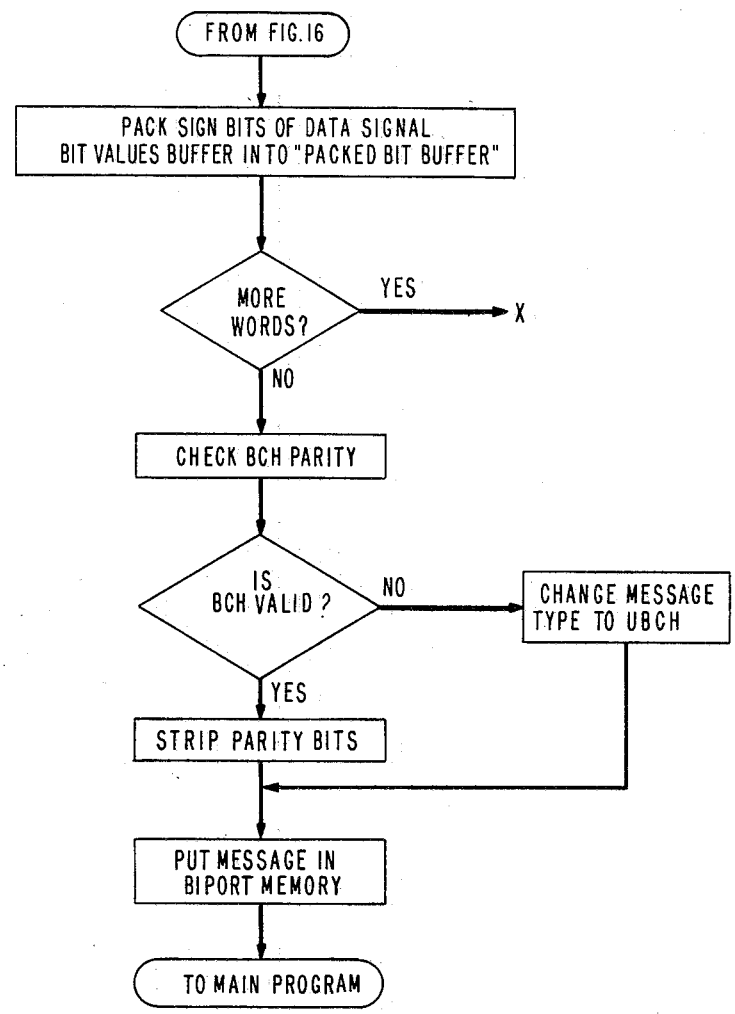

FIG. 11 is an overview diagram of the recurrent process for decoding a single message. Initialization and dotting detection, including the dotting detector threshold (DDT) test, are covered in FIGS. 12 and 13, along with the initial setting of clock 23. FIG. 14 shows the Barker detector and its included time-out test with the looping back to initialization in the event of time-out. DCC detection follows, as per FIG. 15, along with a loop back to initialization if an error limit is exceeded. Data collection is shown in FIG. 16, and both it and the DCC detect routing make use of a clock update routine in FIG. 18. Finally, message BCH is checked and, as shown in FIG. 17, the message is passed to the biport memory 38—but with an unsatisfactory BCH (UBCH) indication if appropriate.

Figure 12:
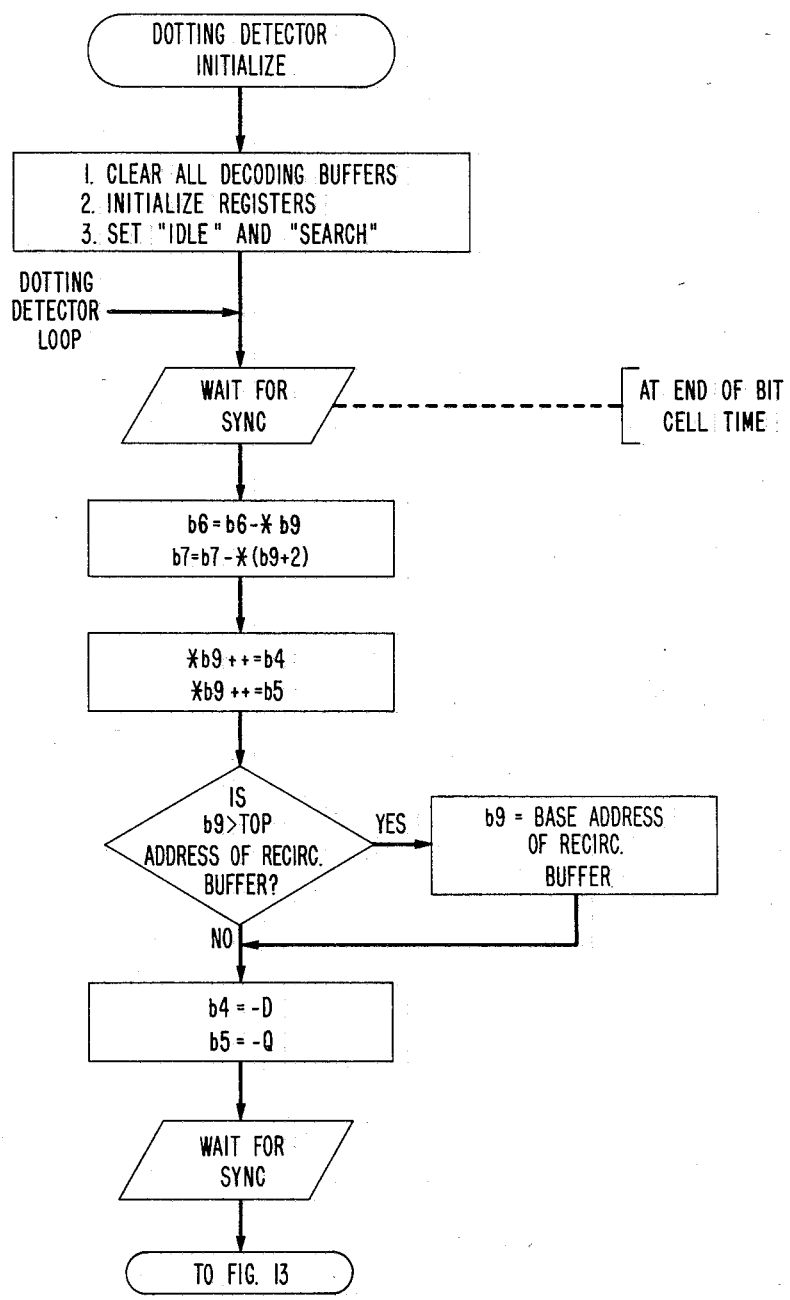
Figure 13:
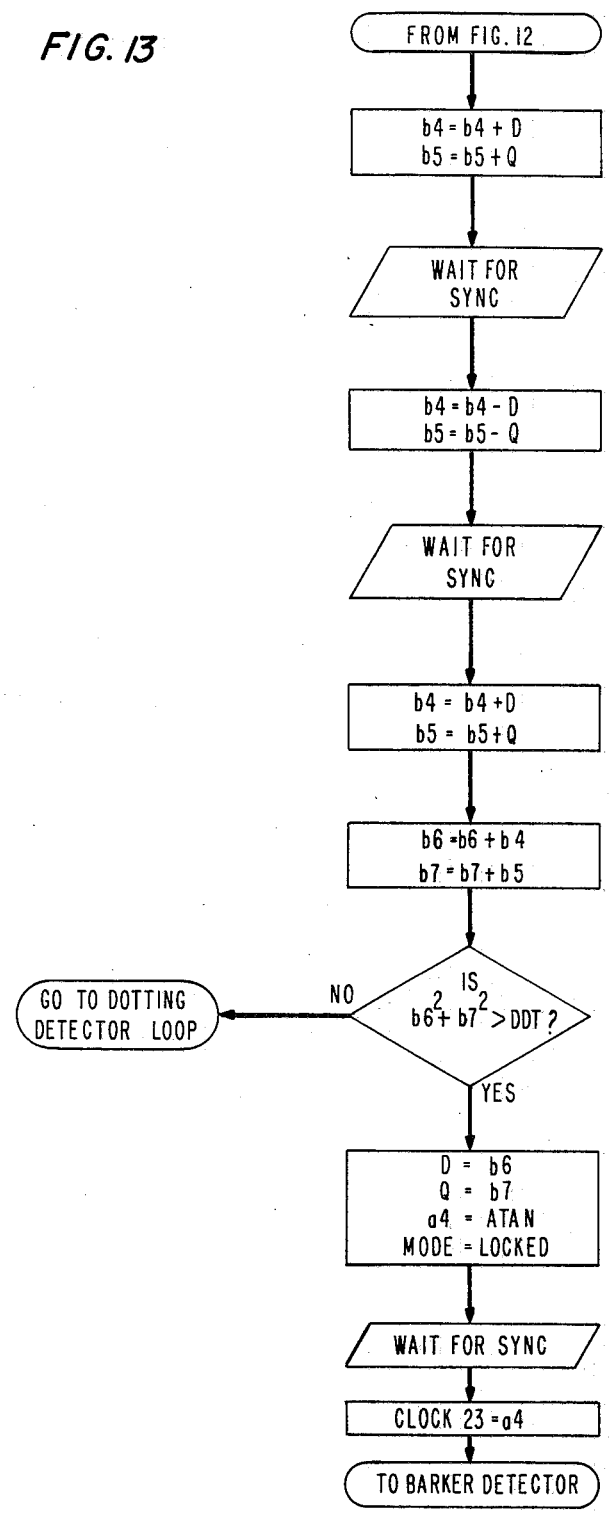
Figure 14:
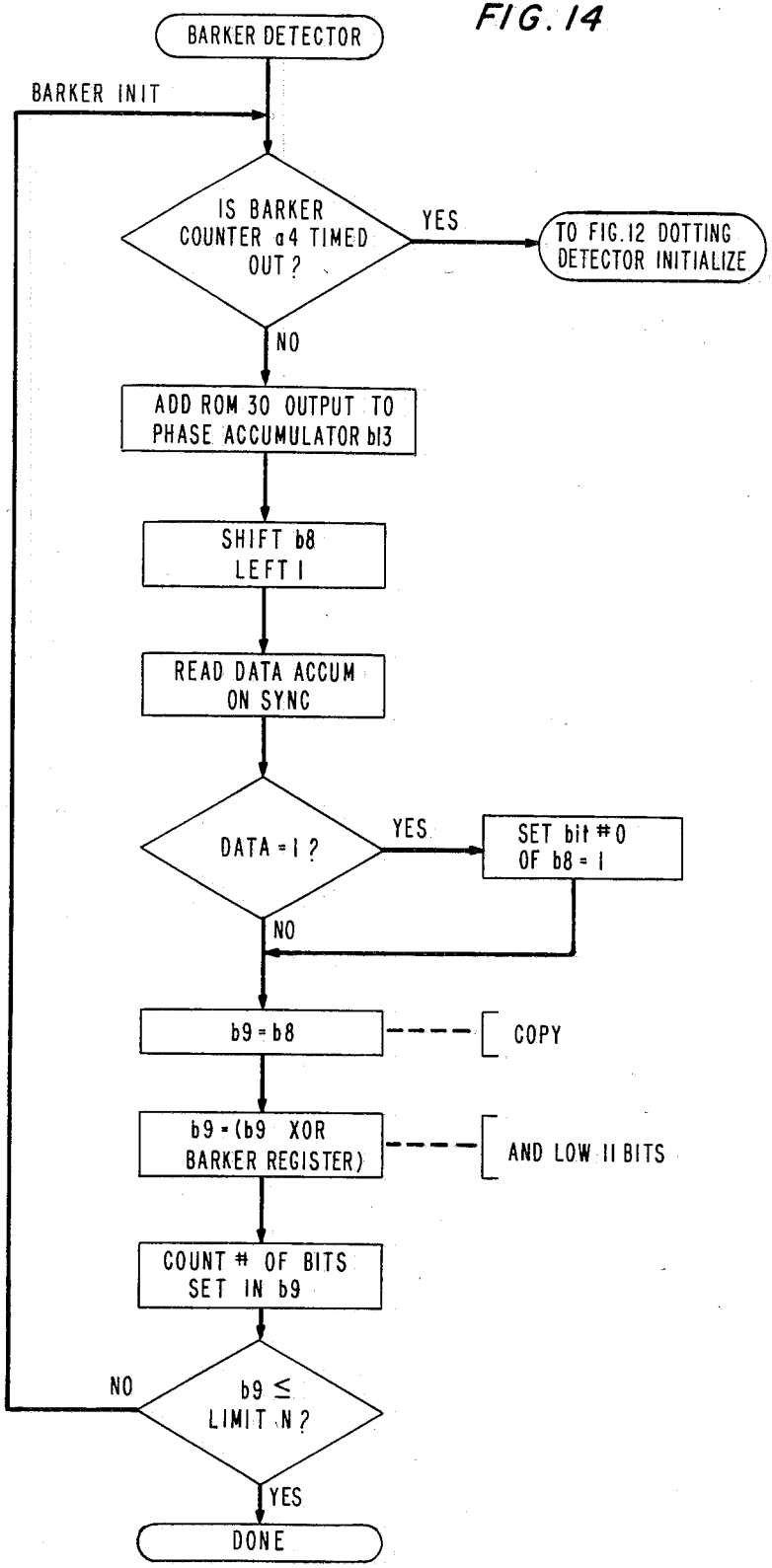

The decoding process begins with a "dotting detect" routine in FIGS. 12 and 13 and using the FIG. 9 search mode memory map. This routine is designed to examine an incoming signal stream for the succession of binary ONE and ZERO bits in alternation which indicates a data message preamble. At the outset, the aforementioned timers, registers, and memory, associated with decoding subprograms of processor 31 are initialized. All buffers shown in FIGS. 9 and 10 in RAM 36 are zeroed, the busy/idle bit in latch 33 is set to the idle state for providing a signal to, e.g., an associated data encoder (not shown), and simultaneously the mode bit of latch 33 is set to the search mode state. The rotating buffer, timers, and counters indicated in RAM 36 in FIG. 9 comprise, as is well known in the art, memory locations for storing the results of processor 31 functions corresponding to the respective names of those locations. The data accumulator 28 and quadrature accumulator 29 (designated D and Q, respectively, in the process diagrams) have the contents of their latches 41 transferred to latches 43. Thereafter, latches 41 are cleared initially and recurrently at a 10-kHz rate for the illustrative data rate without processor intervention.

Because of the alternating ZERO-ONE bit pattern comprising the bit-sync dotting sequence, the dotting detector loop must span integer multiples of two bit times; and, in the embodiment to be described, the dotting detection loop operates over multiples of four bit times. At the completion of each pass through this loop, say at time t, the b6 and b7 registers of the RAM 36 will contain the quantities previously presented, but repeated here for the convenience of the reader:

$$b6(t) = X_t = \sum_{n=0}^{27} (-1)^n D(t-n)$$

and $$b7(t) = Y_t = \sum_{n=0}^{27} (-1)^n Q(t-n)$$

where $D(t-n)$ and $Q(t-n)$ indicate the outputs of the data and quadrature accumulators 28 and 29, respectively, n bit periods before the present time t. The quantities b6 and b7 are used both to detect dotting and, when dotting has been detected, to set the main clock; and they are computed by the following steps. With reference to FIG. 12, the dotting detection is begun by clearing all RAM 36 buffers and registers used in the decoding operation and, of particular interest, registers b6 and b7 and the "recirculating data buffer." The latter is a designated area in RAM 36 (see FIG. 9) of sufficient size to store the separate accumulations of contents of registers b4 and b5, respectively, for each of seven passes through the 4-bit dotting detection loop.

Returning to FIG. 12, the processor 31 performs a "synchronized read" during which the circuitry shown in FIG. 6 initially delays processor operations until the completion of the current bit-cell as indicated by the master clock. Thereafter, the WAIT signal is removed and the processor reads whatever information it had earlier requested.

Once the end of the bit-cell is reached, the contents of the recirculating buffer stored during the loop 24 bit periods previously (and pointed to by register b9) are subtracted from registers b6 and b7. Thus, the remaining data in b6 and b7 represents the results only from the 24 bits preceding the start of the current pass through the loop.

Next, the contents of registers b4 and b5 are stored in the same positions (pointed to by b9) in the recirculating buffer just referenced (replacing the old data); and the address pointer b9, to the recirculating buffer, is incremented by two positions. If this incrementing operating causes b9 to point beyond the top address of the recirculating buffer, b9 is reset to the base address of the buffer. Thus, the space in the buffer is reused and it functions as a circular buffer.

The last step during this bit-time is to reinitialize registers b4 and b5 to $$b4 = -D$$

and $$b5 = -Q$$

where $-D$ and $-Q$ are the negated outputs of the data and quadrature accumulators, respectively, for the immediately preceding bit, and which were transferred to the latches 43 (FIG. 5) internal to both accumulators automatically by the end-of-bit TAL signals.

The processor now again performs a synchronized read; and, when the bit period ends, the new outputs of the D and Q accumulators 28 and 29, which had been reset at the end of the prior bit interval, are added (FIG. 13) to the contents of the registers b4 and b5; and the sums returned to those registers. Note that D and Q, the current outputs of the data and quadrature accumulations were generated by the adders 40 and latches 41 of accumulators 28 and 29 while the processor 31 was engaged in the operations described above (before and up to the completion of the most recent synchronous read). During the third clock cycle, i.e., 100-μs-bit period, the processor 31 again uses the synchronous read to delay until the end of bit operations are completed, after which the new D and Q accumulator outputs are subtracted from the prior contents of the registers b4 and b5.

After using the synchronous read to delay until the fourth clock cycle, the contents of the D and Q accumulators 28 and 29 are added into the accumulating registers b4 and b5. Note that the hardware accumulator 28 and 29 contents are themselves accumulated by being alternately added to, and subtracted from, the contents of registers b4 and b5, respectively. At this point, in FIG. 13, the contents of the latter registers are added into accumulator registers b6 and b7 in the FIG. 9 map of RAM 36 to form an accumulation which spans, illustratively, 28 bit time intervals of the received data signal. This additional accumulation is performed for convenience of actual testing for dotting, as described below, and so that "old" data may be easily removed from the sum.

The operation of alternately adding and subtracting the hardware data and quadrature accumulations to the software accumulations (effectively b6 and b7 by way of the intermediate registers b4 and b5) matches the alternating "zeroes" and "ones" of the bit-sync sequence. Assuming, by way of illustration, that the local clock is in phase with the data, a "zero" bit results in a typical output from the data accumulator 28 of $-43$. Similarly, a "one" bit results in an expected output of $+43$ so that the result of one add-subtract bit pair cycle will be to change the software data accumulation by $43-(-43)$ or 86 on average. However, if the signal from the receiver is noise, one expects a lower, and random, output for which the alternate add-subtracts will not increase as rapidly. Similarly, if a data sequence other than dotting is received, the presence of adjacent equal bits (two "ones", for example) will result in cancellations, so again the sequence does not increase as rapidly.

Next, the contents of the accumulating registers b6 and b7 are squared; and the respective squares are added together. That sum is tested to determine if the sum of the squares is equal to or greater than a predetermined dotting detector threshold DDT. This is a threshold value predetermined to approximate what the sum of the squares of the D and Q accumulator output accumulations would be if at least a predetermined number, e.g., 15, of bits of dotting had been received. The magnitude of that number depends upon the overall sensitivity of the receiver circuits driving the decoder, and represents a compromise between "falsing" on noise (which occurs more frequently if DDT is lowered) and missing valid dotting sequences. If the sum of the squares is not equal to or greater than that threshold, it is assumed that dotting has not yet been detected; and the process loops back to the "dotting detector loop" point in FIG. 11 at the beginning of a new first clock cycle accumulation point. However, if the sum of the squares is greater than or equal to the predetermined threshold, dotting is assumed to be present.

Now, proceeding on the assumption that the sum exceeds or equals the threshold, the process computes the phase error by transferring the unsquared contents of the registers b6 and b7 back to the respective D and Q accumulators 28, 29. There, the accumulations are used, in conjunction with an enabling signal from the synchronizing circuit 32, to read a corresponding phase error signal $\theta$ of the arctan ROM 30. The output of ROM 30 is transferred through the processor 31 via phase error register a4, to the main clock 23. There, after forcing the processor to wait for the end of the current bit by the synch write, the error signal is used for jamsetting clock 23, as hereinbefore previously outlined, to bring the decoder clock system into substantial phase coincidence with the received baseband data signal. At this time, processor 31 also causes the synchronizer 32 to actuate the mode bit of latch 33 to indicate the locked state of decoder operation, i.e., to set the search/locked signal to locked.

In the locked, or track, mode, and with reference to FIG. 11, the decoder looks for the Barker sequence (FIG. 14), the digital color code (DCC) (FIG. 15), and data (FIGS. 16–17), as will be discussed. However, during those operations, the processor 31 frequently checks the phase relationship between the received data and the local clock by reading the output of the arctan ROM 30, and uses its output, after filtering in a manner to be described, in clock phase control 37 to force the main clock to track the received data. In track mode, the steps of the checking operation (the clock update routine of FIG. 18) are as follows:

(1) As its main function, data accumulator 28 generates the (scaled) log-likelihood ratio for the present bit. As described earlier, this is composed of the sum of the likelihood ratios $L_L$ for the individual samples taken during the bit, and so approximates the actual log-likelihood ratio for the bit cell.

(2) The quadrature accumulator 29 similarly generates the time derivative of the (scaled) log-likelihood ratio for the same bit.

(3) At the end of the bit cell, both accumulations are transferred automatically to their accumulator output latches 43 where they are available as address inputs to the arctan ROM 30 previously described.

Figure 18:
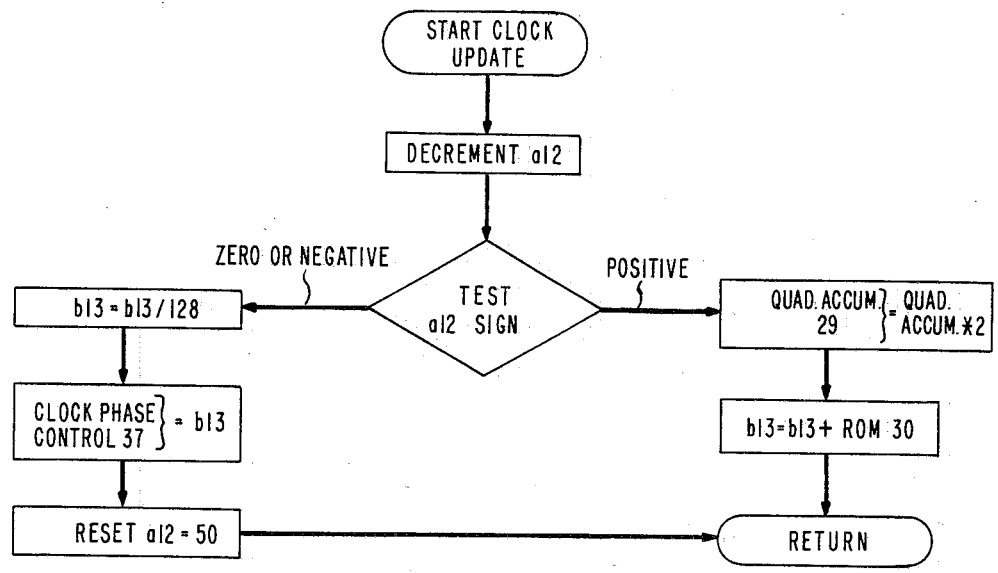

(4) The clock update routine of FIG. 18 is called during most bit times except, e.g., during end-of-word processing when processor 31 is too busy. In bits where the clock update routine is called, the first action of that routine is to decrement the clock update counter register a12. If a12 is positive (having been initialized to 10 prior to the start of the dotting detector so that the first correction occurs early), the Q register is multiplied by 2 to make better use of the restricted address range of the arctan ROM 30. Using the D and doubled Q inputs from the previous bit cell (step 3) as addresses, the arctan ROM 30 is read and outputs a phase correction for that previous bit.

(5) The phase correction read is accumulated into register b13 in FIG. 18. At this point, the clock update routine returns to the routine from which it was called.

(6) If, on the other hand, register a12 has been counted down to 0 or negative, the actions of multiplying Q by 2 and reading the arctan ROM 30 output are skipped; and the processor divides the phase error accumulated in register b13 over the previous, typically 50, bits, with the total including the previous 50-bit average so that the operation is that of filtering. The eight most significant bits of quotient are then jam-set into the phase control counter 37 to control gradual adjustment of main clock 23 as hereinbefore outlined. The counter a12 is then reset to 50. Thereafter, the process loops back to the instruction following the one where the clock update routine was involved as previously mentioned. The 50 bits chosen for this filtering operation are sufficient to extend over most deep fades and represent a compromise between providing excessively noisy clock update signals and being too slow in correction to compensate for oscillator frequency tolerances.

In the beginning of track mode operation, a subroutine illustrated in FIG. 14 is begun, during which the processor 31 waits out the remainder of the received dotting sequence while looking for the occurrence of the predetermined eleven-bit Barker sequence. That sequence is used to establish word synchronization with respect to a received data message. The first step is to check, as to the FIG. 10 Barker Time-out Counter a4, whether the maximum time has expired during which the decoder can detect the Barker sequence. The maximum allowable time differs with the nature of the traffic on a channel and the expected data bit rate. In an illustrative decoder, the time was advantageously 40 bit times for a received data message on a reverse setup channel.

If the maximum time has expired, the processor loops back to the beginning of the dotting detector routine in FIG. 12 to reinitialize and continue in the manner previously described. If the maximum time to detect the Barker sequence has not elapsed, the process then adds the arctan ROM 30 output to the phase error accumulator register b13 and left-shifts by one the contents of register b8 in which data value signs are to be collected. A data bit value from the D accumulator 28 output is read into processor 31 where its sign bit is tested. If it is a ONE, the least significant bit of b8 is set to ONE. The contents of b8 are copied into b9 and the least significant eleven bits thereof EXCLUSIVE-ORed with the BARKER REGISTER contents in RAM 36 to see if Barker has been received.

The result is left in b9 where the member of ONEs is counted and matched against a predetermined limit. The number of comparison mismatches in successive bit intervals is counted to limit the extent of erroneous reception that can occur without detecting the Barker sequence. Different numbers of mismatch errors are permitted for different types of decoder operations. Thus, for a decoder working the reverse portion of a voice channel, three mismatch errors are permitted to occur. Note, however, that in the voice channel formats of some applications, the Barker sequence is advantageously repeated with each repetition of the data; and, once the several repeats have been accumulated, that accumulated data is again checked for a Barker sequence, with no errors allowed. In the case of a reverse setup channel decoder operation, only a single mismatch is allowed to occur.

The mismatch count is tested, and if at least N errors have occurred, the process loops back to the "Barker-Init" point at which this routine began looking for the Barker sequence to check for time-out again. However, if fewer errors have occurred at the time of any given comparison operation, it is assumed that the Barker sequence has occurred; and the process continues in accordance with the particular type of decoder operation that is in effect. In this illustrative embodiment, it is assumed that a reverse setup channel decoder operation is the one illustratively under consideration. Accordingly, the next step in the process is a subroutine which looks for the occurrence of the seven-bit digital color code (DCC) indicating, in service areas where channel sets are reused, which channel set use was employed by the transmitter that sent the data message being received.

Figure 15:
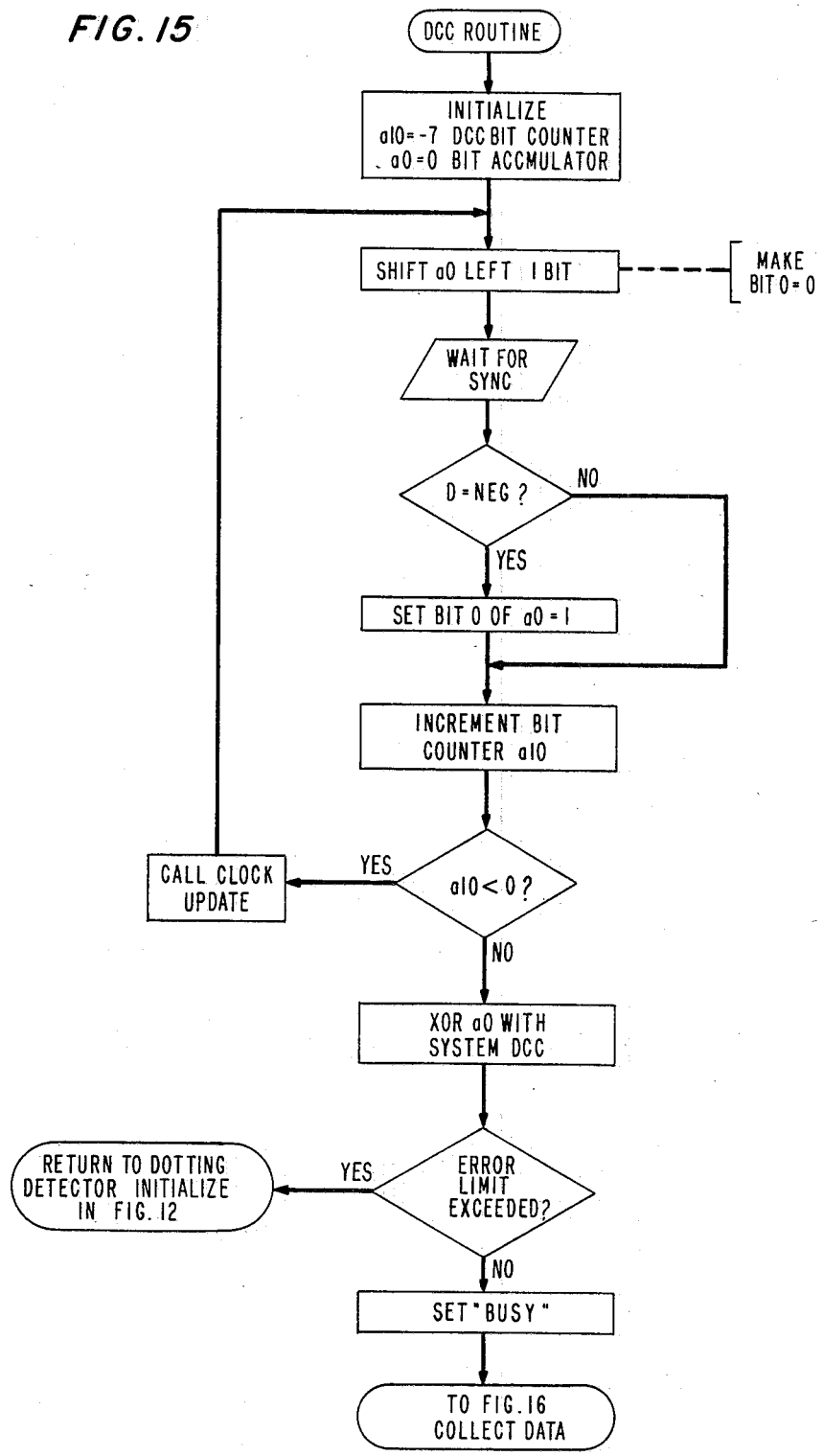

A DCC Detect routine is shown in FIG. 15. The first step is to initialize a DCC bit counter, indicated in FIG. 10 as register a10, to minus seven and clear a bit accumulation register a0. Each bit accumulation output from the D accumulator 28 is moved into processor 31 where its sign bit is shifted into register a0. The sign bits of the values of the seven bits following the Barker sequence are compared with a digital color code (System DCC in FIG. 10) assigned previously and stored in RAM 36 for use by the receiver to indicate whether or not the received data is valid for the particular cell site in which the decoder under consideration is located.

If the digital color code is not valid (unity error limit exceeded, i.e., six of the seven bits must agree for a valid code), the process loops back to the Dotting Detector subroutine of FIG. 12 to reinitialize and begin again. If the DCC is valid, the process sets the latch 33 busy/idle bit to the busy state; and a latch output indicating that state is available, e.g. to an encoder, (not shown), to be transmitted back on the forward side of the setup channel for indicating to other mobile units that the reverse setup channel has been seized by a mobile unit for data transmission.

Further initialization is now carried out per FIG. 16 to enable the decoder to process data word repetitions for collecting data. A software Word Repeat Counter indicated in the FIG. 10 map of RAM 36 as a0 is initialized to the zero-count condition. The starting address of a "signal bit value" buffer for the current word is stored in register b7. That address is then copied into a pointer register b6, which is used for the address of the bit within the current word. A software bit counter a5 in RAM 36 is initialized to a 47-count condition, i.e., one less than the number of bits of a radio word in FIG. 2.

Thereafter, the successive data bit values of each 48-bit repeated word taken from the D accumulator 28 are transferred automatically (via the same data accumulator outputs which feed the arctan ROM) to the received signal strength indicating (RSSI) weight combiner ROM 39 for use, in conjunction with a digitized signal indicating received signal strength at the antenna of the receiver associated with the decoder, for addressing the combiner ROM 39.

Correspondingly weighted data bit values, hereinafter called "signal bit values" to distinguish them from unweighted values of message bits used to address ROM 39, produced by the combiner ROM are then transferred through the data bus 34 to the processor 31 where each such weighted signal bit value is added into a respective different integer field of a data signal bit values buffer (which had been initialized before entering the dotting detector loop to 0) in the RAM 36. That is, the signal bit value for the current bit is added to the contents of the data signal bit values buffer and the sum stored back in the same location of the buffer. In this way, a log-likelihood ratio, combining the information contained about the bit in all five repeats, is generated. The data signal bit value buffer address pointer b6 is incremented, and the bit counter a5 is decremented.

As each such weighted bit value is thus stored, the bit counter content is tested to see whether or not it is negative, i.e., whether or not 48 bits have been received to indicate a received data repeat such as shown in FIG. 2. If the bit count is not yet negative, the "clock update" routine of FIG. 18, described earlier in connection with FIG. 11, is called. The process then loops back to the "bit store" point to await the end of the current bit period.

Returning to the process point in FIG. 16 at which bit counter a5 content polarity was tested, a negative polarity means that the current bit is the last of the present 48-bit message repeat word. The word repeat counter a0 is incremented, and its count tested to determine whether or not it is equal to five. If it is not yet equal to five, a sequence of five repetitions has not yet ended; and the process loops back to a REPEAT LOOP point to await a new bit to be weighted. However, if the count has attained the 5-count level, the end of a repeat sequence for a word has been reached.

When five repeats have been accumulated, the sign of the total accumulation is packed (FIG. 17) into a bit position in the "packed bit buffer" of RAM 36 in the corresponding bit order of the received data word. The F and NAWC fields (FIG. 2) of this buffer are examined; and, if there are more words in the message, the process loops back to X in FIG. 16 to place a new word start address in b7 and begin processing a new word. When all of the 48-bit words have been received, they can then be tested for parity and transferred to the biport memory 36.

In FIG. 17, a 12-bit BCH error detecting the correcting code (the FIG. 2 parity bits) in each word is tested for validity, i.e., used to test the words just received to see if that word is valid. If not valid, the message is passed to the biport memory 38 with an unsatisfactory BCH indicator UBCH. If valid, all bits, except the 36 information bits of the several words received, are removed; and only those information bits are passed to the biport memory 38. The process then returns to the main program.

Although the invention has been described in connection with a particular embodiment thereof, it is to be understood that additional embodiments and various modifications and applications thereof which will be apparent to those skilled in the art are included within the spirit and scope of the invention.

What is claimed is:

1. In a data decoder for regenerating baseband data which represents signal information by different signal bit combinations, each bit being represented by either a first or a second signal state, means for weighting plural versions of digitally represented signal information individually according to at least one predetermined information utility criterion to produce multiple weighted versions thereof, means for averaging said multiple, weighted versions of said information from said weighting means, and means for determining from an average produced by said averaging means the information-representative signal state.

2. The decoder in accordance with claim 1 in which said weighting means comprises means for deriving multiple samples in different bit time phases of each received information bit, and means for weighting said samples according to the likelihood that their respective amplitudes at their respective bit time phases represent useful information, and said averaging means comprises means for accumulating weighted amplitude values of said samples over an information bit time to produce said average.

3. The data decoder in accordance with claim 1 in which said baseband data is derived from a signal received with variable signal strength, said received signal includes multiple corresponding repetitions of said bit information, said weighting means comprises means for weighting said repetitions according to their respective received signal strengths, and said averaging means comprises means for accumulating, over a predetermined repetition time interval which is adequate for the reception of a predetermined number of said repetitions, each weighted information bit value with the accumulation of weighted values of other repetitions of that bit received during that same interval, the accumulation over said interval being proportional to said average value.

4. The data decoder in accordance with claim 1 in which said baseband data is derived from a signal received with variable signal strength, said received signal includes, at different times, multiple corresponding repetitions of said bit information, said weighting means comprises means for deriving multiple samples in different bit time phases of each received information bit, and means for weighting said samples according to the likelihood that their respective amplitudes at their respective bit time phases represent useful information, said averaging means comprises means for accumulating weighted amplitude values of said samples over an information bit time, said weighting means further comprises means for weighting said weighted amplitude value bit time accumulations of each of said repetitions according to its respective received signal strength, and said averaging means further comprises means for accumulating, over a predetermined repetition time interval which is adequate for the reception of a predetermined number of said repetitions, each signal strength weighted information bit value with the accumulation of weighted values of all other repetitions of such bit received during that same interval, the accumulation over said interval being said average value.

5. The data decoder in accordance with claim 1 in which said signal information is received by way of a transmission channel in which the received strength of said signal information varies and means are provided for applying received signal strength indications to said decoder, said weighting means further comprises means for storing translation values RSSIWT for combinations of data bit values D weighted by corresponding received signal strength indication values NRSSI in accordance with the expression:

$$RSSIWT(NRSSI, D) = [k_w \cdot L_{max}(\gamma) \cdot (D + .5)]$$

where $k_w$ is a constant chosen to make:

$$|RSSIWT| \leq \frac{2^{15} - 1}{5}$$

for RSSI=max and D=15, $\gamma$ is the instantaneous signal-to-noise power ratio, and $L_{max}$ is the extreme likelihood, and means for addressing said storing means with data signal bit values and with received signal strength values, said averaging means comprises means for averaging weighted output translation values from said storing means over repetitions of said information, and means are provided for applying an output of said averaging means to said determining means.

6. The data decoder in accordance with claim 1 in which said weighting means comprises memory means addressable by decoder signal parameters determining said at least one utility criterion and by a corresponding one of said versions, said memory means containing weighted signal translation values corresponding to respective combinations of different values of said parameter and said one version, and means for applying output signals from said memory means to said averaging means.

7. The data decoder in accordance with claim 6 in which said signal information is a data wave of random data information content and is received by way of a transmission channel in which the received strength of said signal information varies, means are provided for applying received signal strength indications to said decoder, said memory means comprises:

first storing means containing a table of limit function translation values, means for addressing said storing means by different combinations of samples of said signal information with clock signals defining a plurality of sampling intervals in each bit time of said signal information, and said translation values comprising, in part, for different combinations of values of signal sample amplitude v and sampling the phase $\theta_t$, weighted signal sample values D of said random data wave, said weighted values of D being expressed by the equality:

$$D(t,v) = \left[ k \cdot L\left( \frac{2\pi v}{g}, t \right) \right]$$

in which k is a scaling constant, t is time, g is a dimensional conversion constant, and L is the log-likelihood ratio of probability densities of decoder input, averaging over the effects of intersymbol interference, given that a binary ONE is transmitted, to those densities given that a binary ZERO is transmitted, said averaging means including means for accumulating said weighted values of D from said first storing means over each bit interval, said memory means further comprises second storing means containing a table of signal strength translation values, said signal strength translation values RSSIWT for combinations of data bit values D weighted by corresponding received signal strength indication values NRSSI in accordance with the expression $$RSSIWT(NRSSI, D) = [k_w \cdot L_{max}(\gamma) \cdot (D + .5)]$$

where $k_w$ is a constant chosen to make:

$$|RSSIWT| \leq \frac{2^{15} - 1}{5}$$

for RSSI=max, and D=15, $\gamma$ is the instantaneous signal-to-noise power ratio, and $L_{max}$ is the extreme likelihood, means for addressing said second storing means with data values from said accumulating means and with received signal strength values, said averaging means further comprising means for accumulating weighted output translation values from said second storing means for a predetermined number of repetitions of said information, and means are provided for applying an output of the last-mentioned accumulating means to said determining means.

8. The data decoder in accordance with claim 7 in which said signal information is a data wave of periodically recurring data information content, and said memory means comprises a memory containing a table of said translation values, means for addressing said memory by different combinations of samples of said signal information and clock signals defining a plurality of sampling intervals in each digital bit time of said signal information, and said translation values comprising, for different combinations of expected values of signal sample amplitude v and sampling time phases $\theta_t$, weighted signal sample values D of said periodic data wave, said weighted values of D being expressed by the equality:

$$D(t,v) = [k \cos \theta_t Z(v)]$$

in which k is a scaling constant, and Z(v) is a likelihood ratio of (a) the time average of conditional expectation density of the sample voltage v at time t conditioned on the observed value of v to (b) the time average probability density of the observed value of v at time t.

9. The data decoder in accordance with claim 8 in which said memory further includes as an additional part of each of said limit function translation values a weighted quadrature value Q for expected combinations of sample amplitude v and bit time phase $\theta_t$, said weighted quadrature values being expressed by:
$$Q(t,v) = [k \sin \theta_t Z(v)],$$

and said averaging means includes means for separately averaging said weighted sample values D and said weighted quadrature values Q from said memory means.

10. The data decoder in accordance with claim 6 in which a source of clock signals is provided, said weighting means comprises means for producing weighted true and quadrature values of plural samples of each data bit in said information, said averaging means comprises means for separately averaging, for each said data bit, said true and quadrature weighted values from said weighting means, means are provided for storing translation values for expected combinations of true and quadrature signals from said averaging means, said translation values comprising ratio values of said true and quadrature information, means are provided for applying outputs of said separately averaging means to address said storing means, and means, responsive to an output of said storing means, are provided for adjusting operating phase of said source of clock signals.

11. The data decoder in accordance with claim 10 in which said storing means comprises a first table storing said ratio values for periodic data signal information according to the expression:

$$\theta = \left[ \frac{255.5}{2\pi} \mod\{\pi - 2 \, atan2(Q+.5, D+.5), 2\pi\} \right]$$

where Q and D are said true and quadrature signals, respectively, and a tan 2 is the two-argument arctangent function, and a second table storing said ratio values for a random data signal information wave according to the expression:

$$\hat{\phi} = \frac{f_0(L) \, \hat{\phi}_o + f_1(L) \cdot \hat{\phi}_1}{f_0(L) + f_1(L)}$$

where $f_o(L)$ is the probability density function of the log-likelihood ratio L given that a '0' bit was transmitted, $f_1(L)$ is the corresponding probability function given that a '1' bit was transmitted, $\hat{\phi}_o$ is the phase error estimated given that a '0' bit was transmitted, and $\hat{\phi}_1$ is the corresponding phase error estimated given that a '1' bit was transmitted.

12. The data decoder in accordance with claim 6 in which said signal information is a data wave of randomly varying data information content, and said memory means comprises a memory containing a table of said translation values, means for addressing said memory by different combinations of samples of said signal information and clock signals defining a plurality of sampling intervals in each digital bit time of said signal information, and said translation values comprising, for different combinations of expected values of signal sample amplitude v and sampling time phases $\theta_t$, weighted signal sample values D of said randomly varying data wave, said weighted values of D being expressed by the equality:

$$D(t,v) = \left[ k \cdot L\left(\frac{2\pi v}{g}, t\right) \right]$$

in which k is a scaling constant, t is time, g is a dimensional conversion constant, and L is the log-likelihood ratio of the probability density of decoder input, averaging over the effects of intersymbol interference, given that a binary ONE is transmitted, to the corresponding density, given that a binary ZERO is transmitted, and $L_{max}$ is the maximum value of L for any possible decoder input.

13. The data decoder in accordance with claim 12 in which said memory further includes, as an additional part of each of said translation values, a weighted quadrature value Q for expected combinations of sample amplitude v and bit time phase $\theta_t$, said weighted quadrature values being expressed by:

$$Q(t,v) = \left[ k_q \cdot q\left( \frac{2\pi v}{g}, t \right) \right]$$

where $k_q$ is a scaling constant and q is the time derivative of L, and said averaging means includes means for separately averaging said weighted sample values D and said weighted quadrature values Q from said memory means.

14. In a data decoder for regenerating baseband data,
means for performing an approximate maximum likelihood translation on each of plural signal amplitude samples taken during each symbol,
means for combining translated samples from an output of said performing means for said each symbol, and
means for producing an output signal including a binary ONE or ZERO signal level indication, depending on the sign of a combined, translated sample, symbol amplitude.

* * * * *